(12) United States Patent
Mullis et al.

(10) Patent No.: US 11,838,174 B2
(45) Date of Patent: Dec. 5, 2023

(54) MULTICAST FAST FAILOVER HANDLING

(71) Applicant: Schweitzer Engineering Laboratories, Inc., Pullman, WA (US)

(72) Inventors: Tristan Lloyd Mullis, Pullman, WA (US); Steven D. Herrmann, Pullman, WA (US); Robert Meine, Port Richey, FL (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 176 days.

(21) Appl. No.: 17/679,339

(22) Filed: Feb. 24, 2022

(65) Prior Publication Data

US 2023/0269128 A1    Aug. 24, 2023

(51) Int. Cl.
*H04L 12/18* (2006.01)
*H04L 41/0654* (2022.01)
*H04L 45/00* (2022.01)

(52) U.S. Cl.
CPC .......... *H04L 41/0654* (2013.01); *H04L 12/18* (2013.01); *H04L 45/22* (2013.01)

(58) Field of Classification Search
CPC . H04L 12/18; H04L 41/0654; H04L 41/0663; H04L 45/16; H04L 45/22; H04L 45/24; H04L 45/28
See application file for complete search history.

(56) References Cited

U.S. PATENT DOCUMENTS

| | | | |
|---|---|---|---|
| 6,747,957 B1 | 6/2004 | Pithawala | |
| 7,218,632 B1 | 5/2007 | Bechtolsheim | |
| 7,376,831 B2 | 5/2008 | Kollmyer | |
| 7,872,983 B2 | 1/2011 | Lai | |
| 8,553,544 B2 | 10/2013 | Lai | |
| 8,800,044 B2 | 8/2014 | Raad | |
| 9,038,151 B1 | 5/2015 | Chua | |
| 9,237,129 B2 | 1/2016 | Ling | |
| 9,286,171 B2 | 3/2016 | Cardona | |

(Continued)

FOREIGN PATENT DOCUMENTS

| | | |
|---|---|---|
| EP | 2765751 | 8/2014 |
| KR | 20150051107 | 5/2015 |
| WO | 2015038040 | 3/2015 |

OTHER PUBLICATIONS

Braun, Wolfgang, Menth, Michael, Software-Defined Networking Using OpenFlow: Protocols, Applications and Architectural Design Choices, Future Internet, May 12, 2014.

(Continued)

*Primary Examiner* — Melvin C Marcelo
*Assistant Examiner* — Natali Pascual Peguero
(74) *Attorney, Agent, or Firm* — Stoel Rives LLP

(57) ABSTRACT

Devices, systems, methods, and techniques for multicast failover handling in a computer communication network are disclosed. The methods herein described are particularly suited to software-defined networks (SDNs), and comply with requirements for assuring delivery of network traffic to each destination from a source engaged in multicast network traffic dissemination, assured delivery of each data packet as introduced into the network by the source device and avoidance of duplicate delivery of data. The methods herein are agile and respond rapidly to changes in a network while traffic is on the network.

20 Claims, 11 Drawing Sheets

(56) References Cited

U.S. PATENT DOCUMENTS

| | | |
|---|---|---|
| 9,432,255 B1 | 8/2016 | Hasan |
| 9,432,380 B2 | 8/2016 | Margalit |
| 9,680,588 B2 | 6/2017 | Connolly |
| 9,686,125 B2 | 6/2017 | Smith |
| 9,769,060 B2 | 9/2017 | Dearien |
| 10,863,558 B2 | 12/2020 | Powers |
| 11,165,685 B2 | 11/2021 | Mullis |
| 11,228,521 B2 | 1/2022 | Mullis |
| 2002/0172157 A1 | 11/2002 | Rhodes |
| 2003/0112821 A1 | 6/2003 | Cleveland |
| 2003/0125924 A1 | 7/2003 | Lines |
| 2003/0133443 A1 | 7/2003 | Klinker |
| 2003/0188159 A1 | 10/2003 | Josset |
| 2005/0025141 A1 | 2/2005 | Chao |
| 2005/0078672 A1 | 4/2005 | Caliskan |
| 2005/0192008 A1 | 9/2005 | Desai |
| 2008/0005558 A1 | 1/2008 | Hadley |
| 2008/0080384 A1 | 4/2008 | Atkins |
| 2009/0257743 A1 | 10/2009 | Chung |
| 2009/0285093 A1 | 11/2009 | Bolt |
| 2009/0313189 A1 | 12/2009 | Sun |
| 2010/0241608 A1 | 9/2010 | Huang |
| 2011/0085567 A1 | 4/2011 | Beecroft |
| 2011/0087952 A1 | 4/2011 | Marin |
| 2013/0077477 A1 | 3/2013 | Daraiseh |
| 2013/0108259 A1 | 5/2013 | Srinivas |
| 2013/0159865 A1 | 6/2013 | Smith |
| 2013/0212285 A1 | 8/2013 | Hoffmann |
| 2013/0250770 A1 | 9/2013 | Zou |
| 2013/0263247 A1 | 10/2013 | Jungck |
| 2013/0294228 A1 | 11/2013 | Ahuja |
| 2014/0025945 A1 | 1/2014 | McGrew |
| 2014/0029451 A1 | 1/2014 | Nguyen |
| 2014/0064100 A1 | 3/2014 | Edwards |
| 2014/0112130 A1 | 4/2014 | Yang |
| 2014/0115706 A1 | 4/2014 | Silva |
| 2014/0129700 A1 | 5/2014 | Mehta |
| 2014/0153572 A1 | 6/2014 | Hampel |
| 2014/0160939 A1 | 6/2014 | Arad |
| 2014/0226467 A1 | 8/2014 | Park |
| 2014/0241345 A1 | 8/2014 | DeCusatis |
| 2014/0245387 A1 | 8/2014 | Colpo |
| 2014/0280834 A1 | 9/2014 | Medved |
| 2014/0325038 A1 | 10/2014 | Kis |
| 2014/0325649 A1 | 10/2014 | Zhang |
| 2014/0371941 A1 | 12/2014 | Keller |
| 2014/0376406 A1 | 12/2014 | Kim |
| 2015/0081762 A1 | 3/2015 | Mason |
| 2015/0112933 A1 | 4/2015 | Satapathy |
| 2015/0195190 A1 | 7/2015 | Shah Heydari |
| 2015/0312658 A1 | 10/2015 | Winzer |
| 2015/0363522 A1 | 12/2015 | Maurya |
| 2016/0043996 A1 | 2/2016 | Syed Mohamed |
| 2016/0119299 A1 | 4/2016 | Amulothu |
| 2016/0142427 A1 | 5/2016 | de los Reyes |
| 2016/0165454 A1 | 6/2016 | Li |
| 2016/0330076 A1 | 11/2016 | Tiwari |
| 2016/0337247 A1 | 11/2016 | Yao |
| 2016/0344592 A1 | 11/2016 | Cook |
| 2017/0026225 A1 | 1/2017 | Smith |
| 2017/0026226 A1 | 1/2017 | Grussling |
| 2017/0026243 A1 | 1/2017 | Berner |
| 2017/0026252 A1 | 1/2017 | Dearien |
| 2017/0026276 A1 | 1/2017 | Dearien |
| 2017/0026291 A1 | 1/2017 | Smith |
| 2017/0026292 A1 | 1/2017 | Smith |
| 2017/0026349 A1 | 1/2017 | Smith |
| 2017/0317780 A1 | 11/2017 | Wood |
| 2018/0295057 A1* | 10/2018 | Cui ........................ H04L 45/306 |
| 2019/0116053 A1 | 4/2019 | Allan |
| 2019/0273717 A1 | 9/2019 | Dearien |
| 2021/0135972 A1* | 5/2021 | Mullis ..................... H04L 41/04 |
| 2023/0061491 A1 | 3/2023 | Mullis |

OTHER PUBLICATIONS

Cahn, Adam, Hoyos, Juan, Hulse, Matthew, Keller, Eric, Software-Defined Energy Communication Networks: From Substation Automation to Future Smart Grids, Smart Grid Communications, IEEE Oct. 2013.

Dally, William J., Virtual-Channel Flow Control, IEEE Transactions on Parallel and Distributed Systems, vol. 3, No. 2, Mar. 1992.

Jain, Sushant, et al., B4: Experience with a Globally-Deployed Software Defined WAN, ACM SIGCOMM Computer Communication Review, vol. 43 Issue 4, pp. 3-14. Oct. 2013.

Monaco, Matthew, Michel, Oliver, Keller, Eric, Applying Operating System Principles to SDN Controller Design, Hotnets '13, Nov. 2013.

Drutskoy, Dmitry, Keller, Eric, Rexford, Jennifer, Scalable Network Virtualization in Software-Defined Networks, IEEE Internet Computing, vol. 17, Issue: 2, Nov. 27, 2012.

Kuzniar, Maciej, et al., Automatic Failure Recovery for Software-Defined Networks, HotSDN '13, Aug. 16, 2013.

Mizrahi, Tal, MOSES, Yoram. ReversePTP: A Software Defined Networking Approach to Clock Synchronization, HotSDN '14, Aug. 22, 2014.

Ramos, Ramon Marques, et al. SlickFlow: Resilient Source Routing in Data Centere Networks Unlocked by OpenFlow, 2013 IEEE 38th Conference on Local Computer Networks, Oct. 2013.

Torhonen, Ville, Designing a Software-Defined Datacenter, Master of Science Thesis, Tampere University of Technology, May 2014.

Yang, Qiaoyin and Smith, Rhett, Improve Protection Communications Network Reliability Through Software-Defined Process Bus, Jan. 2018.

Dearien, Jason: "Setting Up a Fully Redundant RSTP-to-SDN Tie Point" Application Guide, vol. II AG2017-28, Sep. 22, 2017.

* cited by examiner

MULTICAST FAST FAILOVER HANDLING

TECHNICAL FIELD

This disclosure relates to network communication, and more particularly to devices, systems, methods, and techniques of multicast failover handling in a communication network.

SUMMARY

A communication network is intended to electronically convey data from an origin (a source device) across a plurality of network devices for delivery to a target (a destination device). A communication network configured for multicast transmission of data affords delivery of the same data to multiple destinations. A properly configured multicast network avoids duplicate delivery of data to any given destination while assuring delivery of each data packet of the network traffic to each destination, arriving at each destination in a state identical to the injection state of the data packet into the network at the source.

A failure on the network, such as an obstruction or breakdown of a link on the network (e.g., a demand collision, hardware failure, cut wire) can result in violation of one or more of the delivery rules (e.g., primary route rules), or in a delivery delay than can cause data across plural destination to become asynchronous, stale, or invalid. Such failures are handled with failover handling. Some failover handling protocols tend to result in duplication of data packets at one or more of the destinations in the multicast network. With a high-demand network, failover handling can result in increased traffic on the network and delays that impact subsequent traffic, potentially resulting in additional network failures arising (and greatly amplifying the effects of failover handling). The present disclosure teaches methods of agile, rapid handling of failover scenarios, reduction of redundancy on the network, increased compliance with delivery rules, and more reliability across the network.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
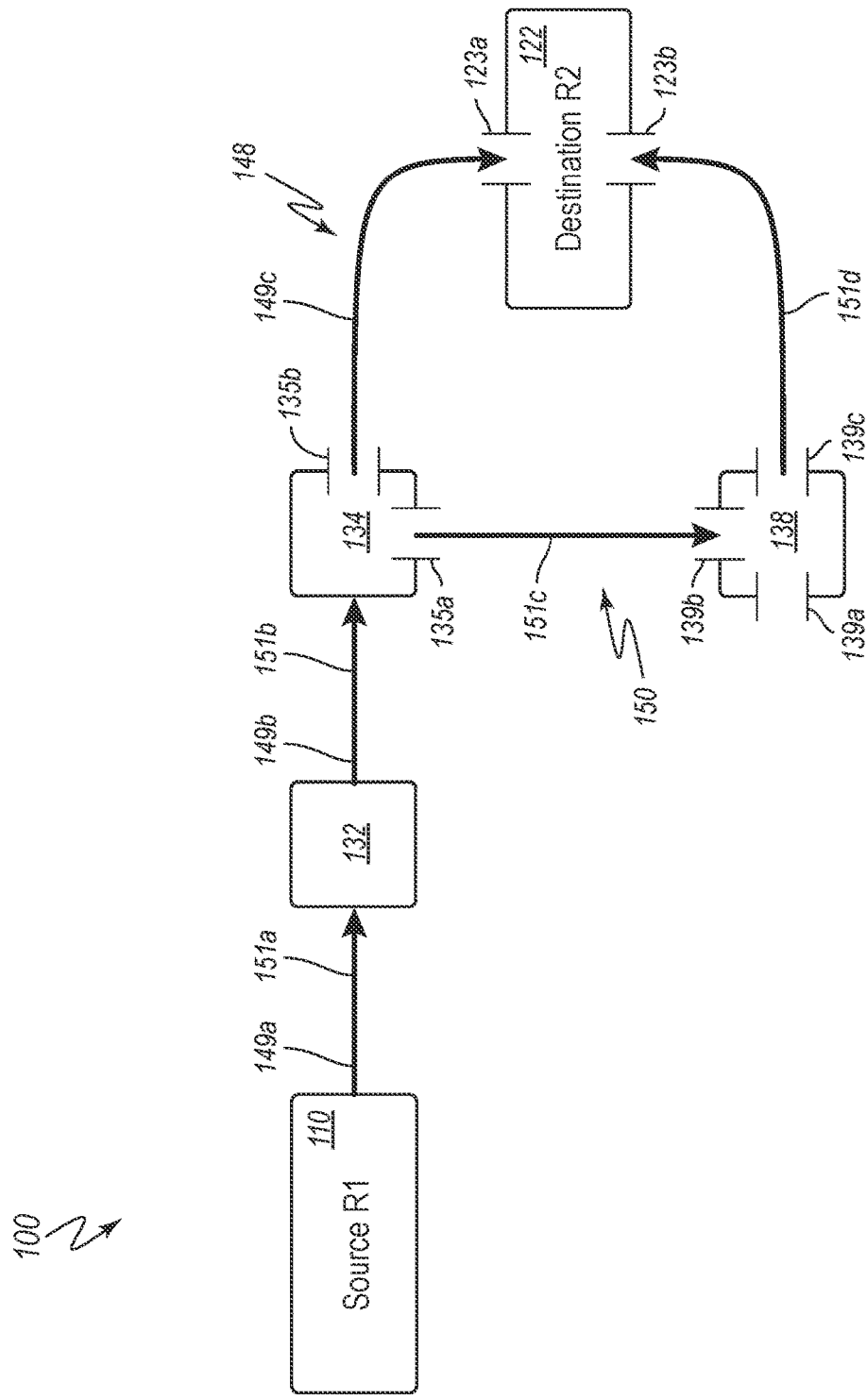
FIG. 1 is a diagram of a portion of a communication network, according to one embodiment.

A communication network provides for electronic communication of data between participants in the network. The communication across a network may be single-connect (from one source to one destination across a plurality of network devices), uni- or bi-directional, multicast, etc. In a computer communication network, protocols are employed at one or more points of the network, such as, e.g., at a source device injecting traffic into the network, to ensure network traffic is timely delivered to each intended destination as sent by the source device without duplicate delivery to a destination. A communication network can be applied in a wide variety of industries, economies, etc. The methods herein described provide improved compliance with delivery requirements, and are particularly suited for application in an electrical power system computer communication network.

A modern electric power system (sometimes herein "power system") may incorporate a variety of control, monitoring, and/or communication technologies and devices that may be used to control, monitor, automate, and communicate information, for example, to protect the power system.

Communication equipment coupled to and/or integrated with the devices may be configured to form one or more communication networks that can be utilized to facilitate an exchange of data among a variety of devices that monitor conditions and/or control actions on the power system to maintain the stability of the power system. The communication network(s) can send messages that carry information for a proper assessment of power system conditions and for implementing control actions based on such conditions. The potential for rapid changes in conditions of a power system results in constraints on the messages sent by a communication network (e.g., time constraints).

In some embodiments, the communication network(s) may include software defined network ("SDN") technologies that may include a controller that regulates communications on the network. SDN technologies offer a variety of features that can be advantageous for use with power systems (e.g., deny-by-default security, latency guarantees, deterministic transport capabilities, network agility, redundancy and fail over planning, etc.).

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. In addition, the terms "comprising" and "including" are open ended and even may allow for the inclusion of elements similar to recited elements but having different characteristics and/or configurations.

As used herein, the term "network" refers to a software defined network (SDN) comprising a collection of computer network devices and connections communicatively (at least nominally) coupling between two or more computing devices (such as a source device and a destination device). An SDN separates a control plane from a data plane; however, an SDN may have a participating network device without such separation. In other words, an SDN may be capable of mixing SDN and non-SDN devices.

As used herein, the phrase "network device" refers to a computing device comprising a capability of interfacing to a computing network and having at least functionality to receive data sent in the network, to send data in the network, to relay data in the network, and to perform functions related to sending, receiving, and relaying data in the network. Examples of a network device include, without limitation, a switch, a hub, a router, an intelligent electronic device (IED), a supervisory control and data acquisition (SCADA) device, etc.

As used herein, the term "port" refers to an interface between a device (e.g., such as a source device, a network device, or a destination device) and a connection to another device. The term is intended here to encompass a port of a switch, a hub, a router, a network interface device, or any other type of interface capable of carrying data to or from the device. Furthermore, the term encompasses both physical and logical ports.

As used herein, the term "connection" refers to an electrical connection between a network device and a source device or a destination device, or between two network devices, and nominally capable of carrying a communication signal (e.g., network traffic) from one device to the next connected device (potentially, bidirectionally). The connection may be a wired connection (e.g., a cable), or wireless.

As used herein, the phrase "network traffic" (or traffic) refers to data traveling from a source device to one or more destination devices along one or more electrical connections between the source device, one or more network devices, and the destination device(s).

As used herein, the term "collision" refers to a data packet of network traffic that will arrive more than once at a particular network device ingress port in all situations. A collision occurs when the same network device ingress port must forward the same data packet in distinctly different ways for different situations.

As used herein, the term "primary route" refers to a route from a source device to a destination device comprising at least one interposed network device and the connections between each of these. A primary route may be a preferred route due to an efficiency or benefit derived from use of the particular set of network device(s) and connections comprising the primary route.

As used herein, the term "failover route" refers to a route (or a portion of route) of a network comprising one or more network devices and the connections between each of these that is employed when a primary route has become unavailable.

FIG. 1 is a diagram of a portion of a communication network (network) 100, according to one embodiment of the present disclosure. The network 100 may be a software-defined network (SDN). The network 100 comprises a source device 110, a destination device 122, and a plurality of network devices 132, 134, 138. The source device 110 and the destination device 122 may each comprise a computing device capable of storing rules and/or computer executable instructions (e.g., at a non-transitory medium), a processor capable of implementing the rules and/or executing the computer executable instructions, and a network interface capable of sending and receiving network communication traffic. The source device 110 and the destination device 122 may also each include additional processors or other means of performing additional computing related functions and/or performing any function related to a purpose of, respectively, the source device 110 or destination device 122.

The source device 110 may send data in the network 100 to be delivered to the destination device 122. Two primary routes 148, 150 are shown between the source device 110 and the destination device 122. A first primary route 148 comprises the network devices 132 and 134, and a plurality of connections 149a, 149b, and 149c. A second primary route 150 comprises the network devices 132, 134, and 138, and a plurality of connections 151a, 151b, 151c, and 151d. The first and second primary routes 148, 150 diverge at the network device 134, where the first primary route exits the network device 134 at a port 135b and enters the destination device 122 at a port 123a; and the second primary route 150 exits the network device 134 via a port 135a, enters a port 139b at the network device 138, exits the network device 138 at the port 139c, and enters the destination device 122a via a port 123b.

In a typical embodiment, the data to be sent across the network 100 is divided into data packets of data (one or more data packets, hereafter, data packets). A data packet comprises a header. The header may comprise a datum or data identifying the destination device or destination devices 122 (destination datum) to which the data packet is to be sent, and may further specify a particular port or interface 123a, 123b at the destination device 122. A primary route 148, 150 may be selected, such as from among one or more available primary routes 148, 150 to use for transmitting the data packet to the destination device 122. The selection of one primary route 148, 150 over the other may be based on currency (e.g., is one of the two primary routes 148, 150 currently in use?) or by an algorithm. Each network device 132-138 comprises a table (or similar) of network rules. The network rules may configure routes of the network 100. As a data packet arrives at a network device 132-138, the network device reads the destination datum from the header. The network device 132-138 compares the destination datum to the network rules table of the network device 132-138. The network rules table at each device 132-138 directs the particular network device 132-138 to deliver the data packet to a next device, wherein the next device may be a network device 132-138 or a destination device 122, based on the destination datum of the header. For example, a data packet may have a header with a destination datum that indicates (in conjunction with the rules table) the data packet is to be routed to the network device 134 then to the destination device 122. When the data packet arrives at the network device 132 from the source device 110, the network device 132 reads the header to find (in conjunction with the rules table) that the data packet is to be sent to the network device 134. The network device 132 then sends the data packet to the network device 134. The network device 134 may read the destination datum to find that the data packet is to be delivered to the destination device 122. The network device 134 then delivers the data packet to the destination device 122. The destination device 122 reads the header, including the destination datum, validates the data packet, and processes or otherwise implements or uses the data packet. In a multicast scenario, delivery of the same data packet may be directed to two different ports 123a and 123b of the destination device 122. Thus, the data packet may be replicated to instantiate two identical data packets (except the destination datum indicating two different destination ports 123a and 123b). One data packet is sent by the network device 134 to the port 123a of the destination device 122 while the other data packet, identical to the first, is sent to the network device 138 for further delivery to the port 123b of the destination device 122.

Figure 2:
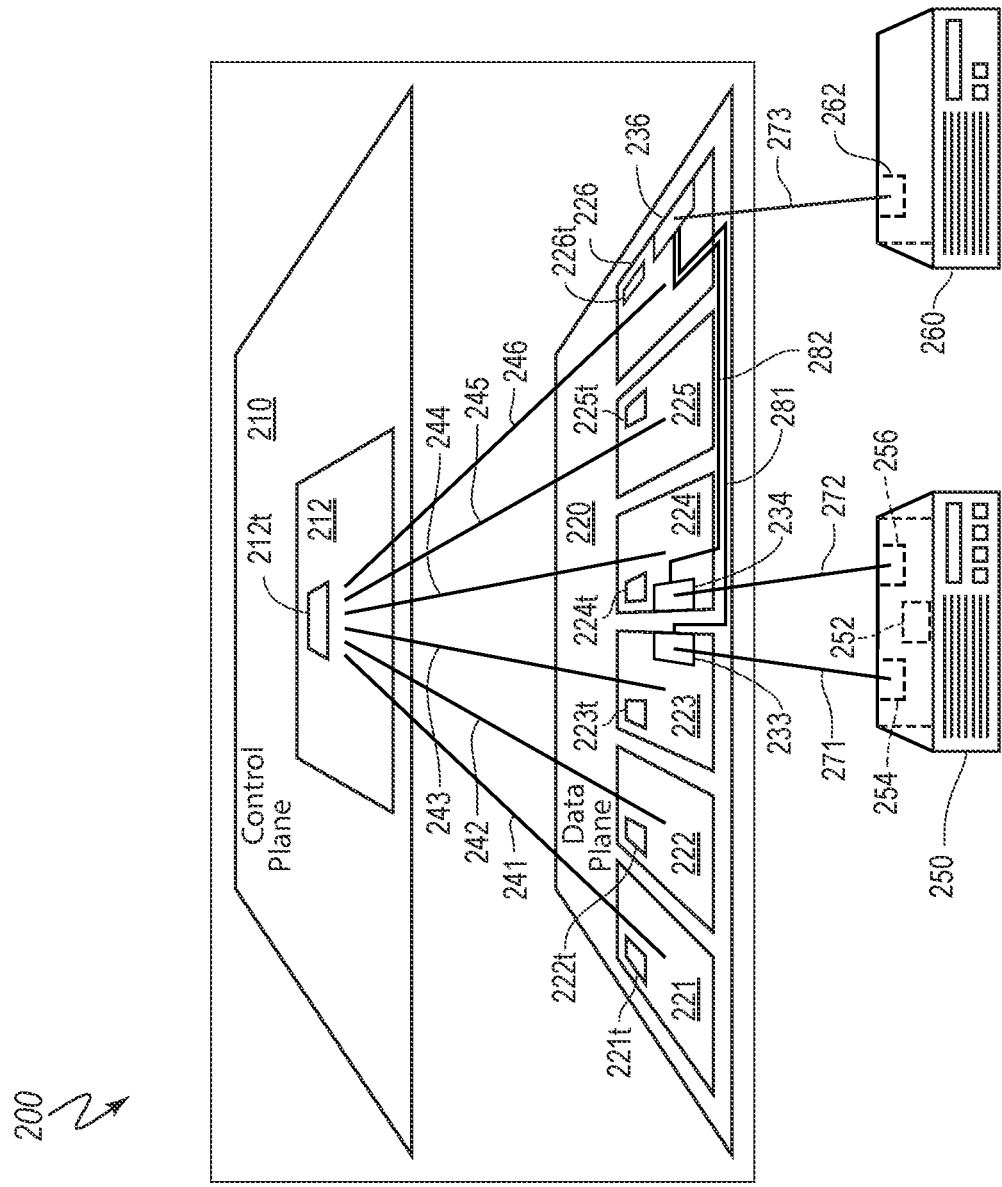
FIG. 2 is a line drawing of a portion of an SDN communication network, according to one embodiment.

FIG. 2 is a line drawing of a portion of an SDN communication network, according to one embodiment. The network 200 may in some ways be analogous to the communication network 100 of FIG. 1. The portion of the network 200 illustrated is an SDN network. The network 200 comprises a control plane 210 and a data plane 220.

The control plane 210 comprises an SDN controller 212 that is in electronic communication with a plurality of SDN switches 221-226 via connections 241, 242, 243, 244, 245, 246. The network controller 212 further comprises a central rules table 212t (e.g., a database) comprising rules (e.g., message (or traffic) handling instructions) for each device associated with the network 200. The data plane 220 comprises a plurality of SDN switches, which may number in the thousands. The illustrated SDN switches 221-226 may be members of the plurality of SDN switches of the data plane 220. In FIG. 2, the plurality of SDN switches may include a first SDN switch 221, a second SDN switch 222, a third SDN switch 223, a fourth SDN switch 224, a fifth SDN switch 225, and a last SDN switch 226.

Each SDN switch 221-226 comprises a local rules table 221t-226t (e.g., a database) comprising message (or traffic) handling rules for messages associated to devices known to the particular SDN switch 221-226. The local rules table 221t-226t for each respective SDN switch 221-226 may be populated with rules held at the central rules table 212t. Each particular rule may be associated with message traffic of each particular communication port of each particular SDN switch 221-226. In other words, a local rules table 223t of the third SDN switch 223 may be populated by the network controller 212 with rules from the central rules table 212t for messages particularly associated to each communication port of the third SDN switch 223. The same method of local rules table population is true for each local rules table at each SDN switch 221-226 such that each local rules table comprises rules for messages received at ports of the particular SDN switch 221-226, and each local rules table may be devoid of rules associated to messages received at the other SDN switches 221-226.

A first network device 250 and a second network device 260 are shown in FIG. 2. Some network devices have one communication port connected to the network 200, and some network devices have a plurality of communication ports connected to the network 200. The first network device 250 is connected to the network 200 via two communication ports 254 and 256 using, respectively, connections 271 and 272. The second network device 260 is connected to the network via a communications port 262 using a connection 273. In the example of FIG. 2, the first network device 250 may be generating data (such as, e.g., monitor data, control data, control-response data, etc.) intended for delivery to at least the second network device 260.

By way of example and not limitation, a first network route 281 illustrates that traffic (messages) arriving from the first network device 250 at the communication port 233 is directed to a communication port 236 of the last SDN switch 266 for delivery to the second network device 260. A second network route 282 illustrates an alternative path whereby traffic from the first network device 250 arriving at the communication port 234 may be routed to the communication port 236 of the last SDN switch 226 for delivery to the second network device 260. As described in the disclosure, only one of the communication ports 233 or 234 may be active at any given time. Likewise, only that network route 281, 282 connected to the active communication port 233, 234 may be active at any given time. The illustrated network routes 281, 282 are representative of any appropriate combination of physical and/or logical connections, pathways, and devices within the SDN network 200. Furthermore, although the network routes 281, 282 are illustrated as wholly distinct from each other, in one embodiment, one or more portions of the first network route 281 may be coexistent with one or more portions of the second network route 282.

Each network device connected to the network 200 comprises a media access controller (MAC). Each MAC has a theoretically unique MAC address. The first network device 250 comprises a MAC 252.

The data plane 220 may comprise dozens, hundreds, or even thousands of SDN switches, including at least the SDN switches 221-226. Each SDN switch may be configured to communicate with one or more network devices, and the number of network devices communicating with any given SDN switch may be in the thousands. Thus, the traffic level for the network 200 may be vast. One method of reducing the volume of traffic on the network to avoid network congestion and ensure both speed and agility is to limit the size of each message. For example, each message may comprise a header and payload. The header may comprise as little as only a MAC address for the originating network device. The payload may be limited to containing only formatted data without intervening identifiers (data-only payload).

An example of a data-only payload may be found in a message from a gas flow meter reporting a current flow rate, a maximum flow rate over a previous period of time, a minimum flow rate over the period of time, and a percentage of a target gas in the flow. With embedded flags to identify each datum, the payload may resemble: Fc0098:Fmax0102: Fmin0094:Mix085. As a data-only payload, this may appear as an integer, e.g., 009801020094085. The former example is 31 characters in length, while the latter is but 15 characters—less than half the length of the former message format. When considered across a network such as the network 200, reducing message payload size by 50% can contribute significantly to network speed and agility.

When the first network device 250 is initially connected to the network 200, the first network device 250 may attempt to negotiate communication with the network via either (but not both simultaneously) a first communication port 254 or a second communication port 256. For this example, the first network device 250 successfully establishes communication with the network 200 via the first communication port 254 and the connection 271 to a communication port 233 of the third SDN switch 223. The first network device 250 may internally designate the first communication port 254 as active and the second communication port 256 as inactive. Once communication is established, the first network device 250 transmits a first data message, comprising a header and payload. In one embodiment, the header may comprise only the MAC address for the MAC 252. The payload may, in one embodiment, be a data-only payload.

When the third SDN switch 223 receives the first payload, the third SDN switch 223 will query the local rules table 223t. Because this is the first message the third SDN switch 223 has received from the first network device 250, it is also the first message from the MAC address for the MAC 252 to be received at the communication port 233 of the third SDN switch 223. The local rules table 223t will, therefore, not have a rule for this first message. The third SDN switch 223 may then communicate the MAC address for the MAC 252 and an identifier for the communication port 233 of the third SDN switch 223 to the network controller 212 via the connection 243. The network controller 212 may then query the central rules table 212t.

In one embodiment, if the MAC address for the MAC 252 is expected to be connected to the network 200, the MAC address will be in the central rules table 212t. In the present example, the particular message is the first message from the first network device 250, hence, the first message bearing the MAC address for MAC 252, to be communicated to the network 200. Accordingly, the MAC address should be found in the central rules table 212t, but has no SDN switch or SDN switch-communication port associated. The network controller 212 may update the central rules table 212t to reflect that the MAC address for the MAC 252 of the first network device 250 is communicating with the network 200 via the port 233 of the third SDN switch 223. The network controller 212 can then initiate a failover test to ascertain if the first network device 250 is capable of failover communication. In other words, the network controller 212 can initiate a test to determine if the first network device 250 is able to communicate with the network 200 via a different communication port of the same SDN switch 223 or another SDN switch.

In another embodiment, the network controller 212 may apply any of a variety of rules to incoming traffic. For example, the network controller 212 may identify incoming traffic by an IP address and/or a traffic type, then may apply appropriate rules to parse the message or otherwise extract an embedded MAC address 252 from the traffic.

The network controller 212 can send a message to the third SDN switch 223, either immediately, or after a pre-configured delay, to disable the communication port 233. In one embodiment, the network controller 212 may update the central rules table 212t to reflect that the MAC address associated with the MAC 252 is undergoing failover testing. In one embodiment, the network controller 212 will also instruct the third SDN switch 223 to re-enable the communication port 233 after a particular period of time (or failover period). In one embodiment, after the failover period, the network controller 212 may send a second instruction to the third SDN switch 223 to re-enable the communication port 233. The failover period may be long enough in duration to permit the first network device 250 to enter a failover state. In other words, the communication port 233 of the third SDN switch 223 may be disabled for an ample period to allow the first network device 250 to recognize that communication with the network 200 via the communication port 254 and connection 271 has ceased. The first network device 250 may recognize the communication failure by, for example, a cessation of message acknowledgements, if used in the particular network regime, the lack of incoming pings from the network 200 on the communication port 254, a de-energized condition of the physical link itself, etc. Because, for the present example, the first network device 250 has the communication port 256, the first network device 250 may remove the active and inactive designations of the communications ports 254 and 256, and may attempt to communicate with the network 200 via the communication port 256. The attempt by the first network device 250 to communicate with the network 200 may, in one embodiment, comprise simply sending a next payload-bearing message via the communication port 256 and intended for at least the second network device 260.

The communication port 256 may pass the next payload-bearing message, via the connection 272, to a communication port 234 of the fourth SDN switch 224. The fourth SDN switch 224 may conduct the same local rules table query described above, followed by a query to the network controller 212. When the network controller 212 receives the query from the fourth SDN switch 224 bearing the same MAC address previously associated with communication via the communication port 233 of the third SDN switch 223, the network controller 212 can update the central rules table 212t to reflect that (a) communication from the MAC address associated with the MAC 252 of the first network device 250 is currently being received at the communication port 234 of the fourth SDN switch 224, and (b) the network device (the first network device 250) associated with the MAC address of the MAC 252 is capable of failover communication. Notably, because the MAC address of the MAC 252 is expected on the network 200, the central rules table 212t may already comprise one or more rules regarding how to handle the messages received from the first network device 250. The network controller 212 can forward to the fourth SDN switch 224 the one or more rules regarding handling of the messages received from the first network device 250 at the communication port 234. The fourth SDN switch 224 can update its local rules table 224t with the one or more message handling rules received from the network controller 212, and can also execute the one or more rules on the current and subsequent message from the first network device 250. The network controller 212 may also send to the third SDN switch 223 the rules for messages bearing the MAC address of the MAC 252 received at port 233 of the third SDN switch 223. The third SDN switch 223 may insert the one or more rules into the local rules table 223t.

If at any time, the first network device 250 detects a failure to communicate with the network 200 via the communication port 256, the first network device 250 can repeat its failover protocol. If the first network device 250 then communicates with the network 200 via the communication port 254, the communication port 233 of the third SDN switch 223 may receive a message having a header comprising the MAC address of the MAC 252. If the network controller 212 has already transmitted to the third SDN switch 223 the one or more rules for messages from the first network device 250 received on the communication port 233, the third SDN switch 223 will find the one or more rules in the local rules table 223t and may then execute the one or more rules. If the network controller 212 has not sent the one or more rules to the third SDN switch 223, the third SDN switch 223 will not find in the local rules table 223t the one or more rules for messages from the first network device 250. The third network switch 223 may query the network controller 212. The network controller 212 may query the central rules table 212*t* and find that the message with the MAC address of the MAC 252 has previously been associated with the communication port 233 of the third SDN switch 223, and, further, that the device associated with the MAC address of the MAC 252 is failover capable. The network controller 212 may then transmit to the third SDN switch 223 the one or more rules for handling messages received at the communication port 233 from the network device (the first network device 250) having the MAC address of the MAC 252.

In a similar example, the first network device 250 may have only one communication port 254. When the first message is sent to the network 200, and, subsequently, the communication port 233 of the third SDN switch 223 is disabled, no messages will arrive at the network 200. When the failover period ends and the communication port 233 of the third SDN switch 223 receives a subsequent message from the first network device 250, the third SDN switch 223 may again query the network controller 212. The network controller 212 may query the central rules table 212*t* and find that the network device (the first network device 250) is undergoing failover testing and was last seen communicating with the network 200 via the communication port 233 of the third SDN switch 223, hence, the first network device 250 does not appear to have a capability to failover to another communication port. The network controller 212 may update the central rules table 212*t* to reflect (a) communication from the network device (the first network device 250) bearing the MAC address of the MAC 252 is being received at communication port 233 of the third SDN switch 223, and (b) the network device (the first network device 250) is not capable of failover communication.

The central rules table 212*t* and the local rules table(s) 223*t* (, 224*t*) may also be updated or otherwise contain rules to generate a message for delivery to another network device, such as a human-machine interface (e.g., a display, a portable monitor, a tablet device, etc.) if the first network device 250 subsequently enters a failover communication mode or stops communicating with the network 200.

A network wherein the network controller does not test for a failover capability of a network device is less agile (less capable of responding to changes in the network), less capable of alerting users of an outage of a network device, and more susceptible to network congestion. For example, if the network controller 212 does not test for a failover capability of the first network device 250, when the first network device 250 enters a failover mode due to loss of communication via the communication port 254, the first network device 250 attempts to transmit messages to the network 200 via the communication port 256. In order for the local rules table 224*t* of the fourth SDN switch 224 to contain rules for handling messages from the first network device 250, the rules must be propagated from the central rules table 212*t* either globally to all SDN switches of the network 200, or particularly added to each SDN switch which may receive communication from the first network device 250. The former option, to a degree, obviates much of the functionality of the central rules table 212*t* while bloating all local rules tables, while the latter requires substantial manual intervention in propagating rules to select local rules tables. Both the former and latter methods also necessitate moving away from configuring all SDN switches to employ a default denial scheme as a means to reduce risk of intrusion by unauthorized systems or users.

Figure 3:
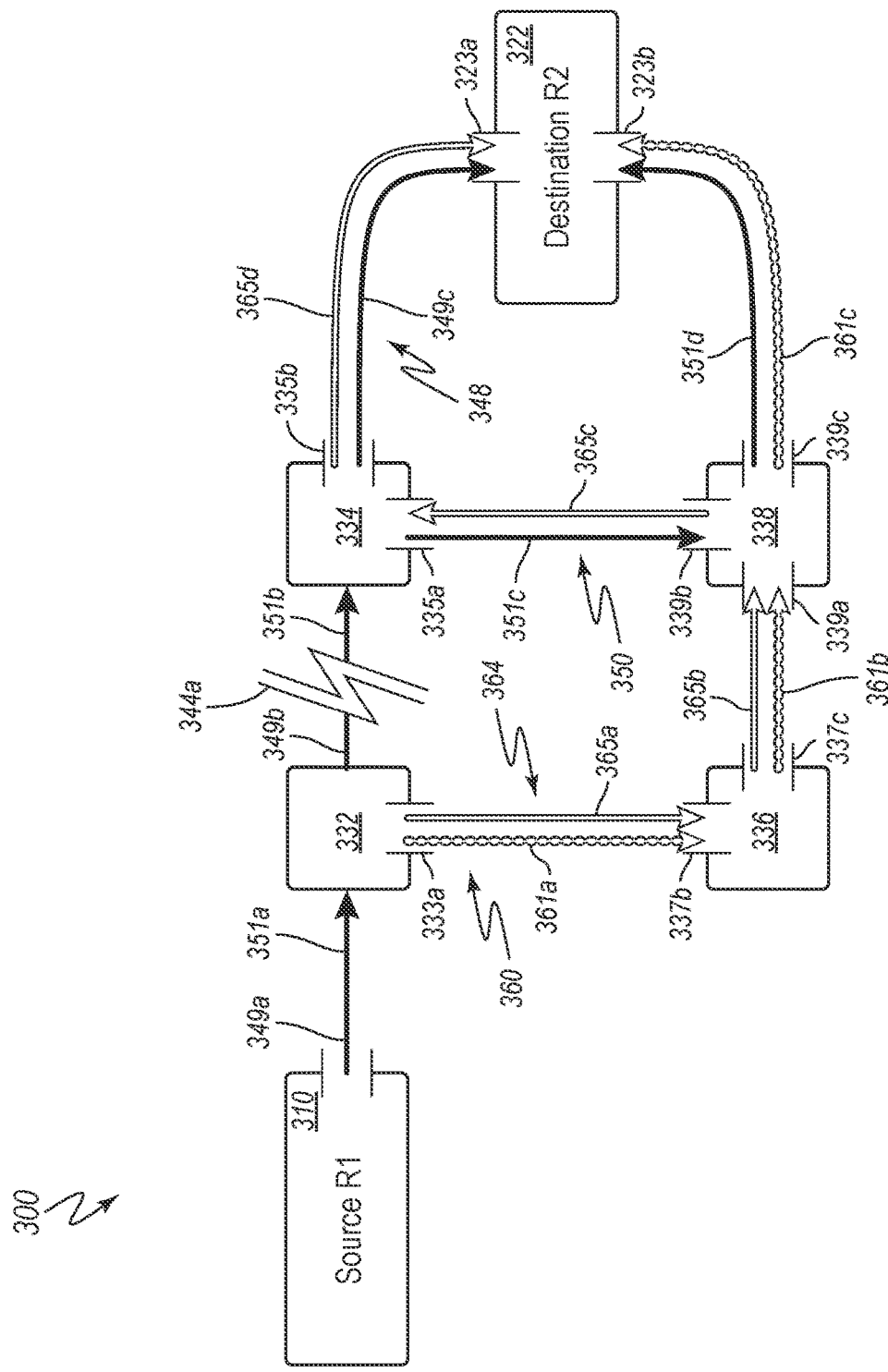
FIG. 3 is the diagram of a communication network of FIG. 1, illustrating failover routes.

FIG. 3 is a diagram of the communication network of FIG. 1, illustrating failover routes 360, 364. Features discussed and described with respect to FIG. 1 are carried over into FIG. 3 with the leading numeral of the labels incremented from 1 to 3. For example, the network 100 of FIG. 1 is the network 300 of FIG. 3; and FIG. 1 illustrates a source device 110 that is the same source device 310 in FIG. 3. The network 300 comprises four network devices 332, 334, 336, 338. The two primary routes 348, 350 comprise, respectively, the connections 349*a*-349*c* and 351*a*-351*d*. FIG. 3 illustrates two failover routes 360 and 364. A connection 349*b*, 351*b* of the primary routes 348, 350 is interrupted 344*a* or otherwise in a failure state (e.g., broken, overloaded) creating a failover scenario. The failover routes 360, 364 provide failover handling for the illustrated failover scenario. The first and second failover routes 360, 364 diverge from the primary routes 348, 350 by exiting the first network device 332 via a port 333*a* using a respective network connections 361*a*, 365*a* to enter a network device 336 at a port 337*b*. The first and second failover routes 360, 364 exit the network device 336 at a port 337*c* using a respective network connection 361*b*, 365*b* to enter the network device 338 at the port 339*a*.

At the network device 338, the failover routes 360, 364 diverge. The first failover route 360 exits the network device 338 via the port 339*c* and uses a connection 361*c* to enter the destination device 322 at the port 323*b*. The second failover route 364 exits the network device 338 via the port 339*b* using a connection 365*c* to enter the network device 334 at the port 335*a*, then exits the network device 334 at the port 335*b* using a connection 365*b* to enter the destination device 322 at the port 323*a*. The connections 361*a* and 365*a* are shown parallel to each other and extending between the network devices 334 and 336; however, this is for ease of illustration and not by way of limitation, as there may be one connection from the port 333*a* of the network device 332 and the port 337*b* of the network device 336. Similarly, one connection exists between the port 337*c* and the port 339*a* of, respectively, the network devices 336, 338; and so forth in each illustrated pair of connections and port pairs 361*b* and 365*b* between 337*c*, 339*a*; 351*c* and 365*c* between 335*a*, 339*b*; 349*c* and 365*d* between 335*b*, 323*a*; and 351*d* and 361*c* between 339*c*, 323*b*.

In the example illustrated in FIG. 3, the network is performing multi-cast delivery to two destination interfaces (ports 323*a*, 323*b*) at the destination device 322. An interruption 344*a* is illustrated at the connection 349*a*, 351*b* of the respective primary routes 348, 350. The interruption 344*a* may be, e.g., a severed cable, a configuration conflict or error at the network device 344, a de-energized or offline state at the network device 344, etc. The network device 332 reads the destination datum from the data packet header. The network device 332 compares the destination datum to the network rules table stored at the network device 332 and determines that the primary route handling requires the network device 332 to pass the data packet to the network device 334. The network device 332 recognizes an inability to pass the data packet to the network device 334 due to the interruption 344. The network rules table at the network device 332 contains the failover routes 360, 364 listed as a failover route for transmitting a data packet with a destination datum in the header for the destination device 322 ports 323*a*, 323*b*. In the current state of the art, the network device 332 replicates the data packet, then performs route tagging. The replication of the data packet can increase network congestion and otherwise expend network resources. Route tagging is the application of a tag to each copy of the data packet based on the failover route to be used to deliver each copy to its destination (ports 323*a*, 323*b*). The tag applied to the respective copy of the data packet comprises a delivery datum (the final network device 338 or 336 before delivery to the destination device 322). One data packet follows the failover route 360 (connections 361a, 361b, 361c), whereby the data packet is delivered to the network device 336, which reads the delivery datum in the tag and compares the delivery datum to the network rules table at the network device 336. The network device 336 then, in accordance with the relevant entry in the network rules table, sends the data packet to the network device 338 with the tag still in place. The network device 338 reads the tag and, according to the relevant entry in the network rules table at the network device 338, removes the tag and delivers the data packet to the port 323b of the destination device 322. Similarly, the network device 332 applies a tag to the other copy of the data packet with a delivery datum representing the network device 334 using the failover route 364 (connections 365a, 365b, 365c, and 365d). The other copy of the data packet is routed, following the network rules at each of the succeeding network devices 332, 336, and 338. When the data packet arrives at the network device 334, the tag is removed and the destination datum from the header is read, then the network device 334 delivers the data packet to the port 323a of the destination device 322.

The network rules table for each network device 332-338 may be generated or regenerated at any time. In one embodiment, the network rules may be generated or regenerated in real time or near-real time when a failover scenario arises. Generation of the network rules table identifies primary routes and failover routes, and further groups failover routes into split failover trace routes (further discussed in conjunction with FIG. 4) based on a common ingress port, a common initial egress port, and a common failover egress port.

Figure 4:
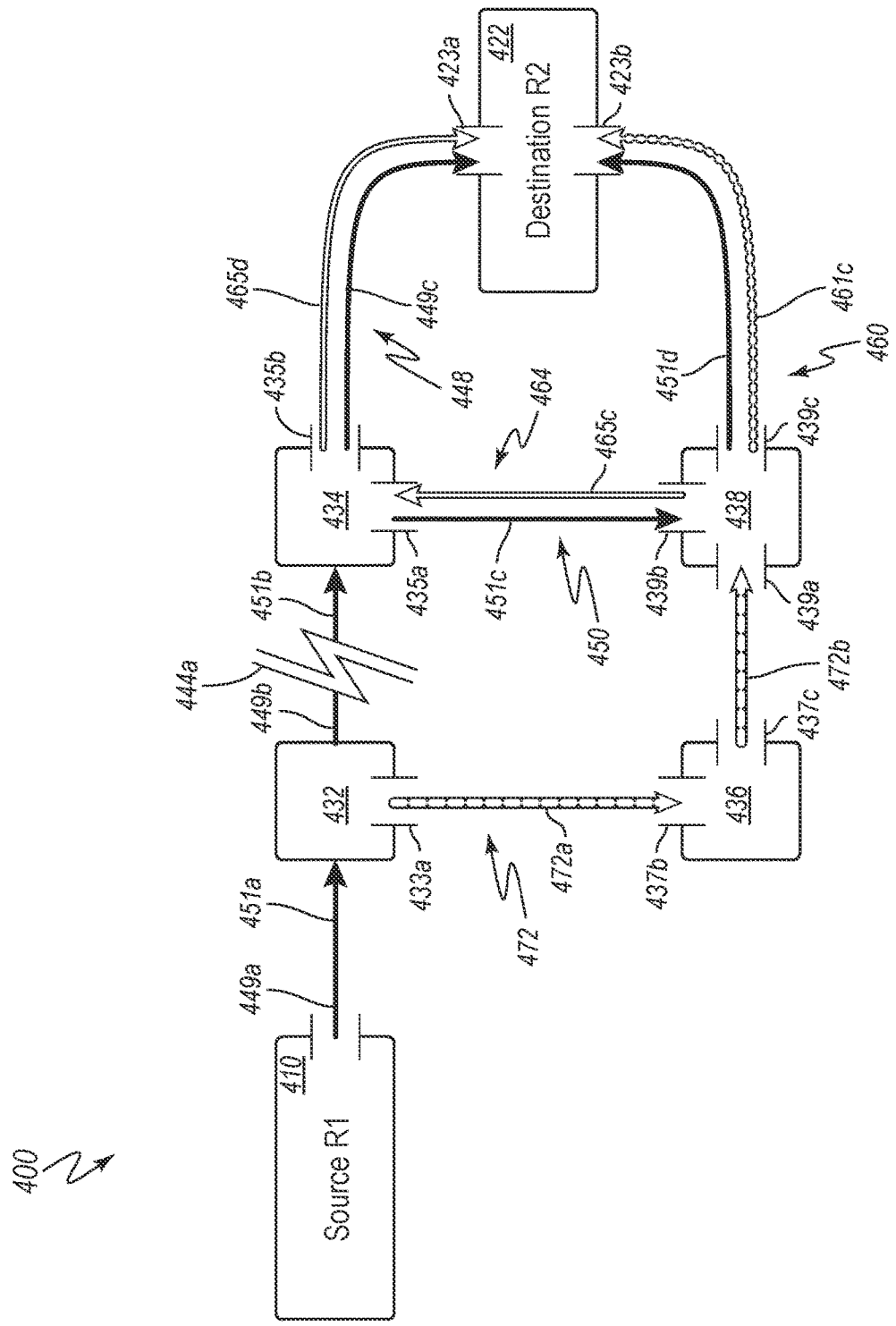
FIG. 4 is the diagram of the communication network of FIG. 3, illustrating multicast failover handling, according to one embodiment of the present disclosure.

FIG. 4 is the diagram of the communication network of FIG. 3, illustrating multicast failover handling, according to one embodiment of the present disclosure. The features of FIG. 4 represent the same features shown in FIG. 3 with the leading digit incremented from 3 to 4. Thus, for example, the network 300 of FIG. 3 is shown as the network 400 in FIG. 4. The source device 410, the destination device 422, and the network devices 432, 434, 436, 438 are shown for reference. The primary routes 448, 450 and the respective connections 449a-449c, 451a-451d are also shown.

FIG. 4 illustrates two failover routes 460 and 464. FIG. 4 illustrates a method of failover handling according to an embodiment of the present disclosure and may be compared to FIG. 3, which illustrates a method of failover handling under currently available network conventions. The failover routes 460, 464 diverge from the primary routes 448, 450 by exiting the first network device 432 via a port 433a using a respective network connections 461a, 465a to enter a network device 436 at a port 437b. The failover routes 460, 464 exit the network device 436 at a port 437c using a respective network connection 461b, 465b to enter the network device 438 at the port 439a. At the network device 438, the failover routes 460, 464 diverge. At the network device 432, the two failover routes 460, 464 have a common ingress port at the network device 432 (from the source device 410), a common initial egress port (to the network device 434), and common failover egress point 433a, giving rise to a split failover trace.

An interruption 444a is illustrated at the connection 449a, 451b of the respective primary routes 448, 450. When a data packet arrives from the source device 410, the network device 432 reads the destination datum from the data packet header. The network device 432 compares the destination datum to the network rules table stored at the network device 432 and determines that the primary route handling requires the network device 432 to pass the data packet to the network device 434. The network device 432 recognizes an inability to pass the data packet to the network device 434. The network rules table at the network device 432 contains a failover rule reflecting the split failover trace. The split failover trace is represented by a path segment 472 (connections 472a, 472b) and the continues to the network device 434, which is the network device farthest downstream from the network device 432 and on any of the failover routes of the group of failover routes in the split failover trace. The split failover trace comprises a path segment 472 having connections 472a and 472b, and the connection 461c of the failover route 460, and the connections 465c and 465d of the failover route 464.

The network device 432 performs route tagging based on the split failover trace to apply a tag to the data packet indicating the data packet should be passed to the last network device 438 of the route segment 472. When the data packet arrives at the network device 438, the network devices 438 reads and removes the tag, and reads the header to obtain the destination datum. The network devices 438 compares the destination datum to the network rules table at the network device 438. For the present example, the network rules table directs the network device 438 to (a) replicate the data packet, (b) deliver one instance of the data packet to the port 423b of the destination device 422, and (c) to apply a tag to the other instance of the data packet with a delivery tag representing the network device 434. The network device 438 then sends the other instance of the data packet to the network device 434. When the network device 434 receives the data packet, the network device reads and removes the tag applied at the network device 438, then delivers the data packet to the port 423a of the destination device 422. Replication of the data tag at the network device 438, instead of at network device 432, is a form of tail end replication that can minimize or otherwise decrease network congestion on and operate to conserve network resources of the network 400. FIG. 4 demonstrates a conservation of network resources as compared to FIG. 3 by delaying replication of a data packet. Stated otherwise, a data packet that would be replicated in FIG. 3, the prior art, at the network device 432 (analogous to 332 in FIG. 3) will transit additional connections 472a, 472b and an intervening network device 436 before being replicated at the network device 438 (analogous to 338 in FIG. 3).

The network rules table for each network device 332-338 may be generated or regenerated at any time. In one embodiment, the network rules may be generated or regenerated in real time or near-real time when a failover scenario arises. The methods herein described provide for rapid, agile network delivery of traffic with tail-end replication (as compared to existent technology) that may reduce the net traffic load on the network while assuring compliance with requirements to delivery exactly one data packet to each destination, including each destination in a multi-cast scenario, without alteration from the original state of the data packet.

Figure 5:
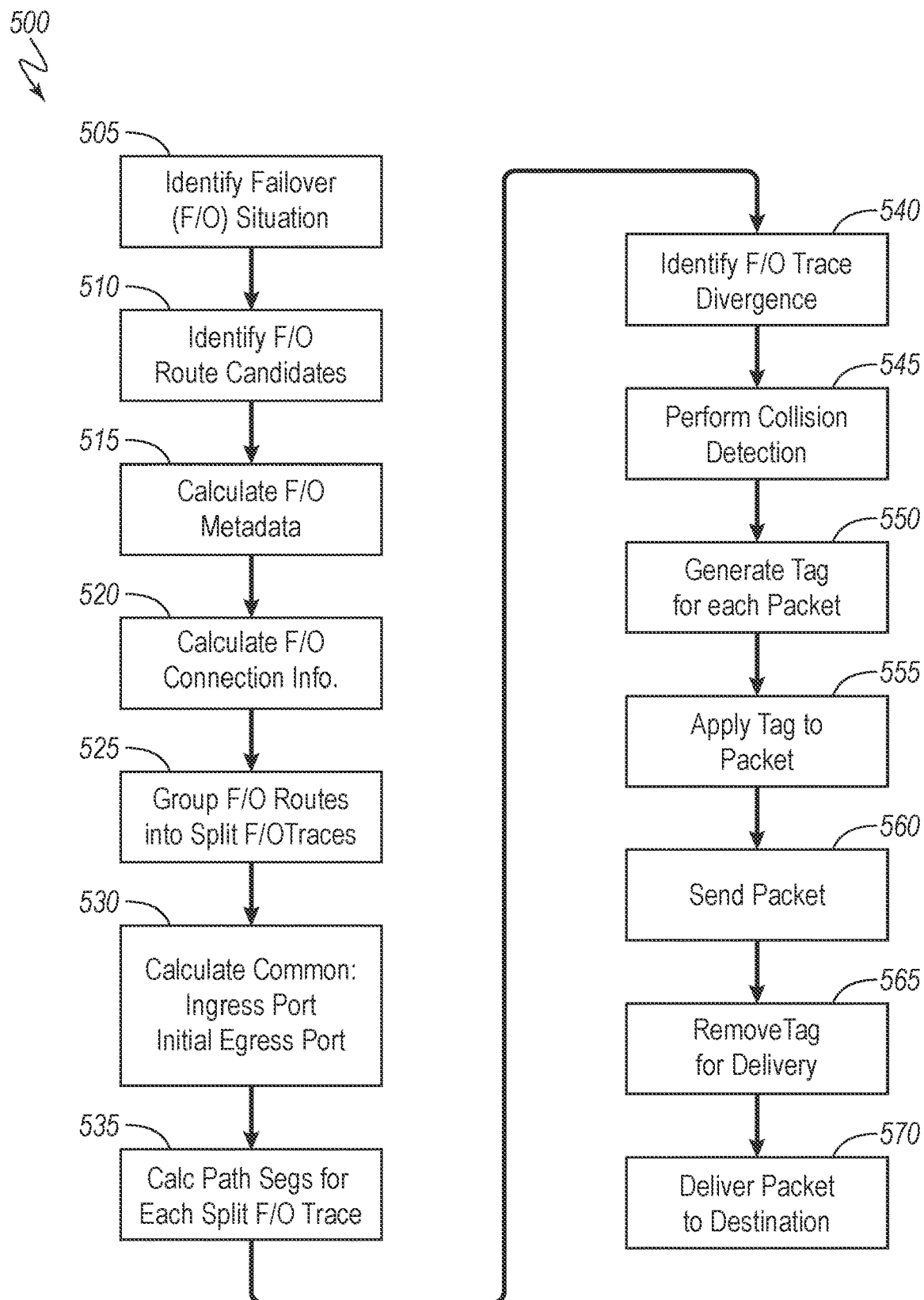
FIG. 5 is a flow diagram of a method of failover handling, according to one embodiment of the present disclosure.

FIG. 5 is a flow diagram of a method 500 of failover handling for a network (such as the network 400 of FIG. 4), according to one embodiment of the present disclosure. The method 500 may be implemented at a network controller (e.g., to pre-generate a set of failover rules for the network) or a network device (e.g., to potentially generate failover rules in real time or near-real time). A failover scenario is identified 505 relative to network traffic to be delivered from a source device to a destination device along a communication network. Failover route candidates are identified 510 by determining possible routes in the network from each device in the network (or from that device that is immediately "upstream" of the failover point in the network) to one or more destination devices. Failover metadata is calculated 515. Failover metadata may comprise identifiers of network devices, and ports that may be used for each connection of each failover route, a failover route terminal network device, etc. Failover connection information is calculated 520, including ingress port, initial egress port, and failover egress port for each failover segment. Failover routes are grouped 525 into split failover traces by calculating 530 or otherwise determining common ingress ports and common initial egress ports, and failover egress ports are tracked. Tracking the failover egress ports enables replication of the data packet at each appropriate location of each failover route of a split failover route trace. Path segments are calculated 535 or otherwise determined for each split failover trace. Where two or more failover routes have common route portions as defined by common ingress port, common initial egress port and common failover egress, the particular routes are grouped in a split failover trace. Grouping into split failover traces permits sending a data packet into the network and permitting or causing the data packet to be replicated at an exit (at a tail end) from the common portions of the failover routes (from the path segment) for delivery to multiple destinations. Split failover trace divergence points in the network are identified 540. In other words, the network device (and port) where the commonality of the failover routes (the path segment) ends and the network traffic must necessarily travel along different portions of the network infrastructure are identified 540. Collision detection is performed 545 to identify any instance wherein a data packet will arrive at the same port more than once. A tag is generated 550 for providing information for the network (e.g., the relevant network devices) to receive, re-tag, de-tag, transmit each data packet correctly for each failover route. The tag may be inserted into the network rules table for the particular device involved in the current failover route processing of the method 500. If the method 500 is implemented in real time or near-real time, the relevant tag is applied 555 to each data packet. Otherwise, when a failover scenario arises, the pertinent device reads the header of the data packet involved, compares the destination datum in the header to the network rules table, retrieves the assigned tag and applies 555 the tag to the data packet. The tag identifies (e.g., contains a delivery datum identifying) that network device which is a last network device before delivery to the destination or a last network device in the failover route (at which point the data packet will re-enter a primary route) or the last network device of a path segment. The data packet is sent 560 to a network device based on the tag. Each succeeding network device on the failover route sends 560 the data packet to a next network device based on the tag. When the data packet reaches a network device that is (a) the network device that delivers to the destination device of the data packet, or (b) is the last device of the failover route (where the data packet re-enters a primary route), the tag is removed 565. The tag may be removed or updated at an upstream network device when that network device is the last network device of a particular path segment. The data packet is then delivered 570 (or continues along the primary route until it reaches that network device that will deliver 570 the data packet) to the destination device.

Figure 6A:
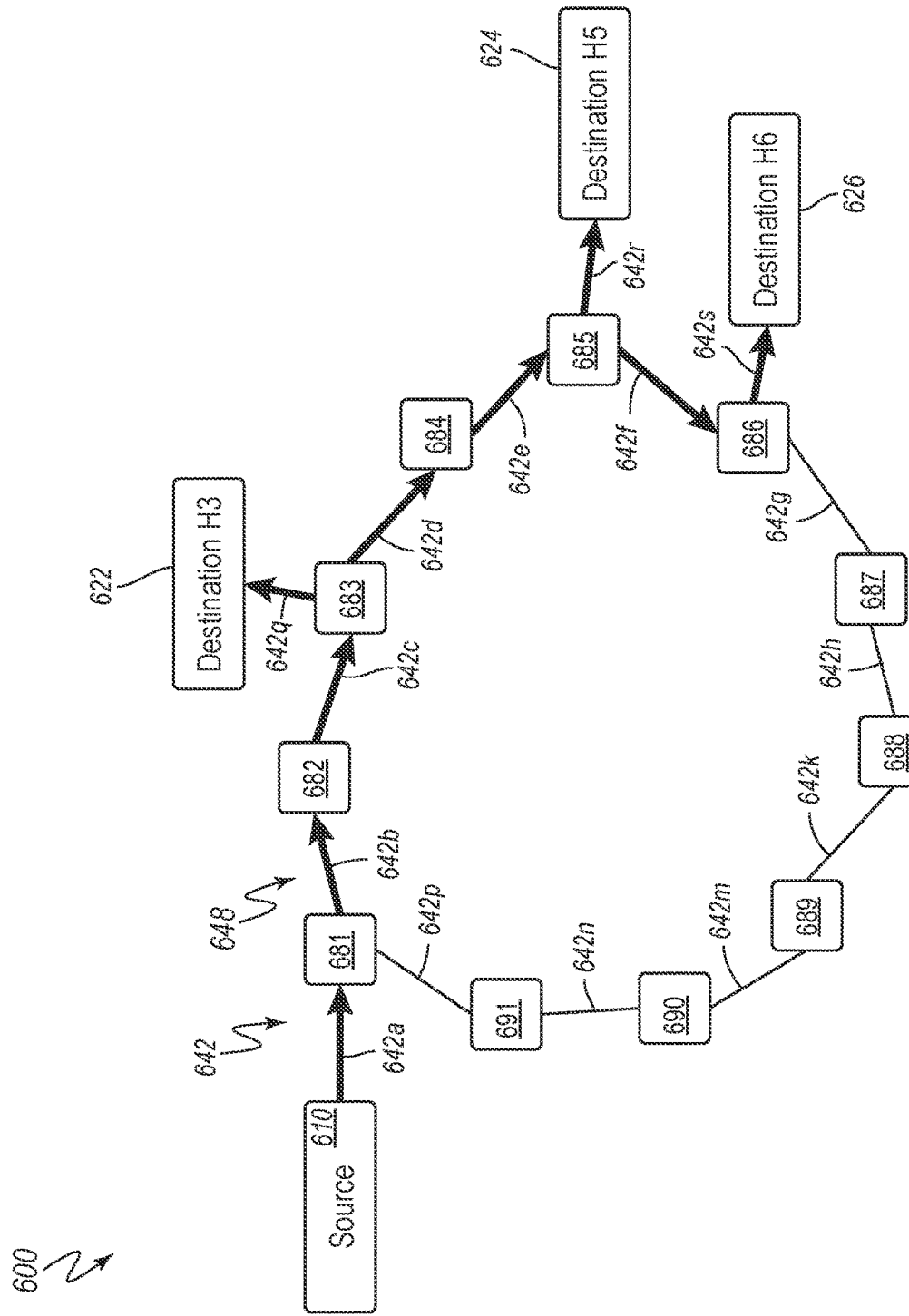
FIG. 6A is a diagram of a portion of a communication network, according to one embodiment.

FIG. 6A is a diagram of a portion of communication network similar in some respects to, and differing in some respects from the network 100, 300, 400 of FIGS. 1, 3 and 4. Some features of the network 600 of FIG. 6A are substantially similar or analogous to features of the networks 100, 300, 400 of FIGS. 1, 3, and 4 and are not fully described below; however, similarities should be apparent to one skilled in the art. For example, the source device 610 in FIG. 6A is, for the purposes of the present disclosure, similar to the source device 110, 310, 410 of FIGS. 1, 3, and 4, and such similarity should be imputed without limitation. Similar or analogous features in FIG. 6A can be readily identified by the appearance of labels that are the same as the analogs of FIGS. 1, 3, and 4 with the leading digit incremented to 6. It should be noted that a series of labels represented by a three-digit number with a letter suffix (642a, 642b, et seq.) appears in conjunction with FIGS. 6A-6C. To avoid confusion, the suffixes i, j, l, and o are omitted.

FIG. 6A is a diagram of a portion of a communication network (network) 600, according to one embodiment of the present disclosure. The network 600 comprises a source device 610, a plurality of network devices 681, 682, 683, 684, 685, 686, 687, 688, 689, 690, 691, and a plurality of destination devices 622, 624, 626. The network 600 has a topology and methodology commonly known in the computer networking field as a ring, with the network devices 681-691 electrically and communicatively coupled to each other in sequence. The present disclosure is not intended to apply exclusively to a ring topology and methodology, but is applicable in any network configuration, such as, e.g., a mesh network, wherein network functionality similar to that of a ring topology and architecture may apply. This illustration is for the convenience of the disclosure and not by way of limitation, as the network 600 may have more or fewer network devices 681-691. The network 600 serves a multicast environment wherein the source 610 is sending network traffic intended for at least two of the destination devices 622-626. A first destination device 622 couples to the network 600 at the network device 683 by a connection 642q. The second destination device 624 and the third destination device 626 each couples to the network 600 at, respectively, the network device 685 (via the connection 642r) and the network device 686 (via the connection 642s).

As shown in FIG. 6A, a data packet has entered the network 600 from the source device 610 for delivery to each of the destination devices 622-626. The data packet comprises a header. In one embodiment, the header comprises a destination datum (or destination data) providing for delivery to each of the destination devices 622-624. The data packet proceeds from the source device via a primary route 642 wherein a route segment 642a couples between the source device 610 and the network device 681, and the connections 642b, 642c, 642d, 642e, and 642f couple respectively between the successive network devices 682, 683, 684, 685, and 686. As the data packet arrives at each successive network device 681-686, the header is read and the destination datum/-a is/are read and compared to the network rules table at each network device 681-686. The relevant network rule is applied, causing the data packet to be sent to the next successive network device 682-686. At the network device 683, the relevant entry of the network rules table provides for the data packet to be replicated, with one instance delivered to the destination device 622. Similarly, the data packet is replicated at the network device 685 with one instance of the data packet delivered to the destination device 624. The network device 686 delivers the data packet to the destination device 626.

In the example of FIG. 6A, the network devices 687-691 and connections 642g-642p are not implicated.

Figure 6B:
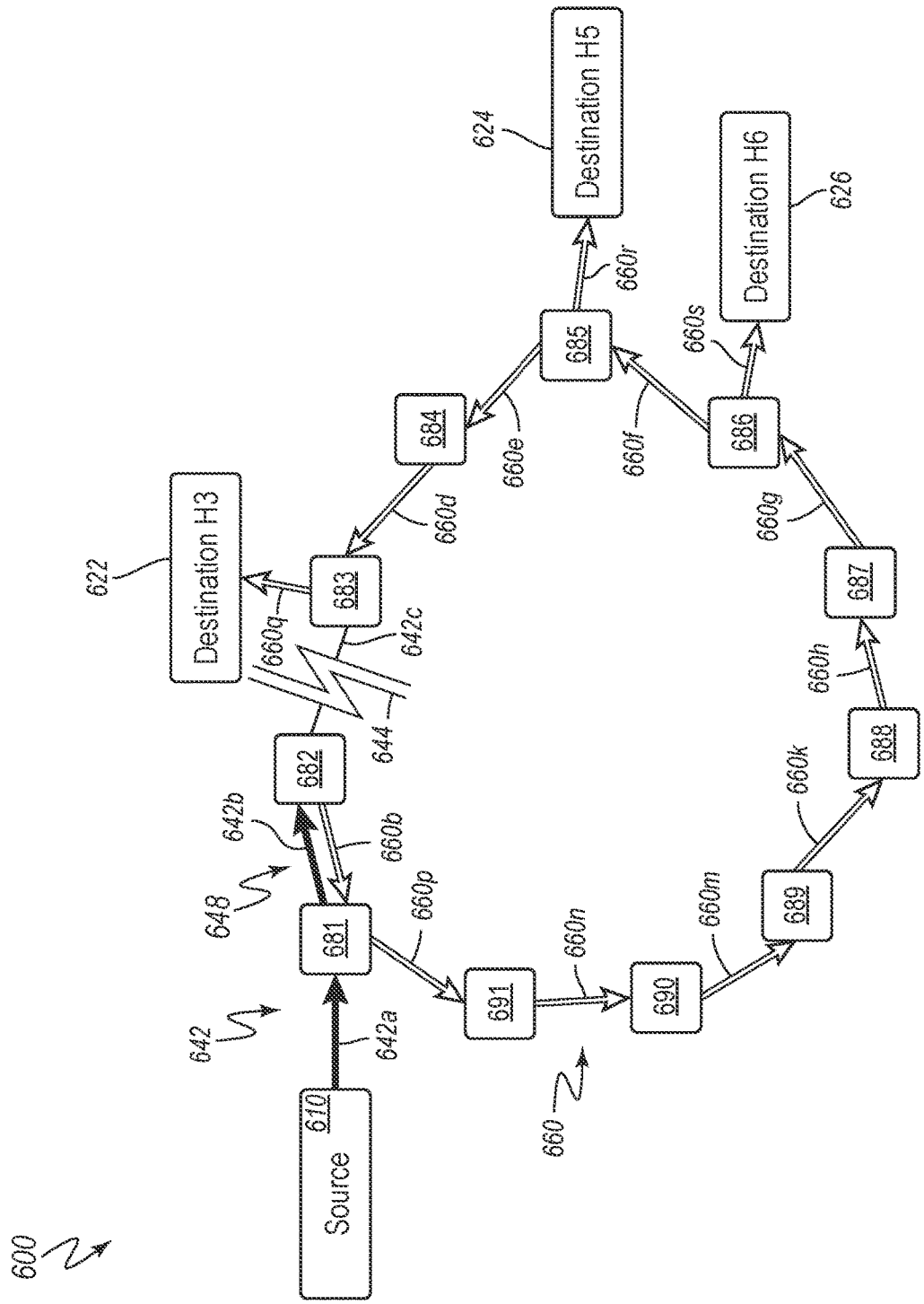
FIG. 6B is the diagram of the communication network of FIG. 6A, illustrating a failover scenario.

FIG. 6B is the diagram of the communication network (network) 600 of FIG. 6A, illustrating a failover scenario.

The source device 610, the destination devices 622-626, and the network devices 681-691 are identified. The data packet header comprises a destination datum/-a directing the data packet be delivered through the network 600 to each of the three destination devices 622-626 using a primary route 642. The data packet has been transmitted from the source device 622 to the network device 681 via the connection 642*a*, and from the network device 681 to the network device 682 via the connection 642*b*. An interruption 644 has arisen at the connection 642*c* precluding transmission of the data packet from the network device 682 to the network device 683. The network rules table at the network device 682 has a failover entry for the destination datum/-a of the data packet header. (In an event wherein the network rules tables lacks a failover rule for the destination datum/-a, the network 600, the network controller, and/or the network device 682 may calculate a failover route in real time or near-real time.) The network device 682 retrieves from the network rules table (or generates) a tag directing delivery, along a failover route 660 and places the tag on the data packet to accomplish delivery to each of the destination devices 622-626. The failover route 660 comprises the connections (in failover route order) 660*b*, 660*p*, 660*n*, 660*m*, 660*k*, 660*h*, 660*g*, 660*f*, 660*e*, and 660*d*. As the data packet arrives at each network device 681, 683-691 (in reverse order), the tag is read and compared to the network rules table, and then sent to the next succeeding network device 683-691 (in reverse order).

When the data packet arrives at the network device 686, the network device 686, in accord with the relevant entry of the network rules table, replicates the data packet to result in two identical data packets (two instances of the data packet). One instance is sent to the network device 685 along the failover route segment 660*f*. The network device 686 removes from the other data packet instance the tag applied by the network device 682 and delivers the other data packet instance to the destination device 626 via the failover route segment 660*s*. In one embodiment, the tag applied at the network device 682 may be removed before replication, and a tag applied only to the data packet instance to be sent to the network device 685. In one embodiment, the network device may first replicate the data packet, then remove the tag from one instance of the data packet to be delivered to the destination device 686. When the network device 685 receives the data packet from the network device 686, the network device 685 will, likewise, replicate the data packet. One data packet instance is delivered without the tag of the network device 686 to the destination device 624. One instance of the data packet is sent, with the tag in place, to the succeeding network device 684. When the data packet arrives at the network device 683, the network device 683 removes from the data packet the tag applied by the network device 682 and delivers the data packet to the destination device 622 via the failover route segment 660*q*.

Figure 6C:
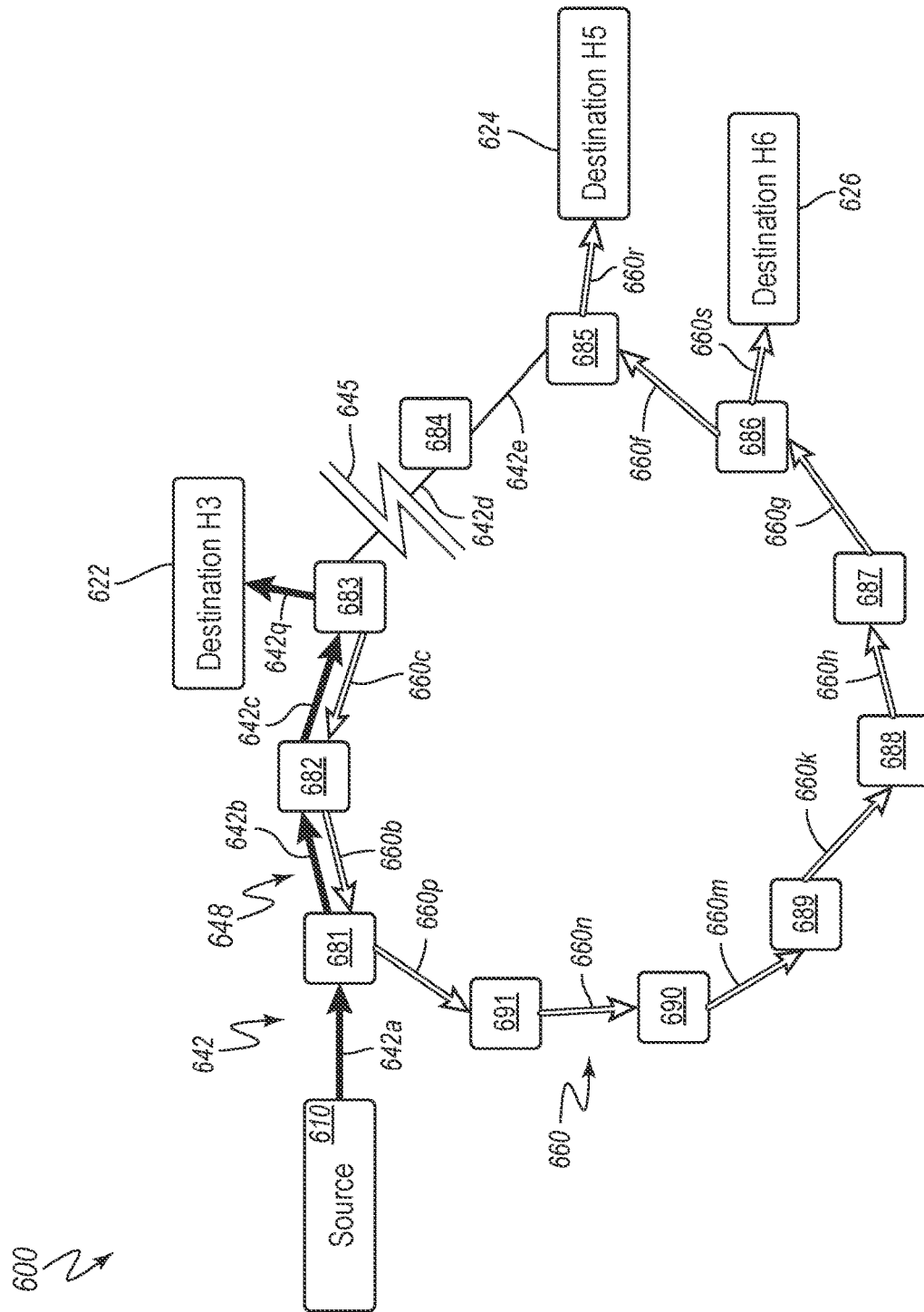
FIG. 6C is the diagram of the communication network of FIGS. 6A and 6B, illustrating a transient duplication.

FIG. 6C is the diagram of the communication network 600 of FIGS. 6A and 6B, illustrating a transient duplication, according to an embodiment of the present disclosure. The source device 610, the destination devices 622-626, the network devices 681-691, the primary route 642, and the connections 642*a*, 642*b*, 642*c*, and 642*d* are identified for reference. The example of FIG. 6C is similar to that of FIG. 6B with one particular distinction. A transient interruption 645 is shown at the connection 642*e* between the network devices 683 and 684. The data packet arrives at the network device 683. One instance of the data packet is delivered to the destination device 622.

Current conventional networking protocols provides that the data packet will be sent along the failover route 660 with a tag that indicates failover routing is in effect, and with the original destination datum/-a. The invention provides that the tag to be applied indicates delivery to the destination devices 685, 686 on the failover route. If the transient interruption 645 resolves while the data packet is on the failover route, the current conventional networking protocols may result in the data packet being delivered to the network device 622 a second time: the first delivery occurs when the data packet first arrives at the network device 683 on the primary route 642, and the second delivery occurs when the data packet arrives at the network device 683 from the network device 684. The present invention avoids the possibility of redundant delivery by employing a tag from a particularly configured network rule of the network rules table at the network device 683 at a point of entry into the failover route 660. The tag of the invention provides that the data packet traveling the failover route 660 is to be delivered to the destination devices 624 and 626.

Figure 7:
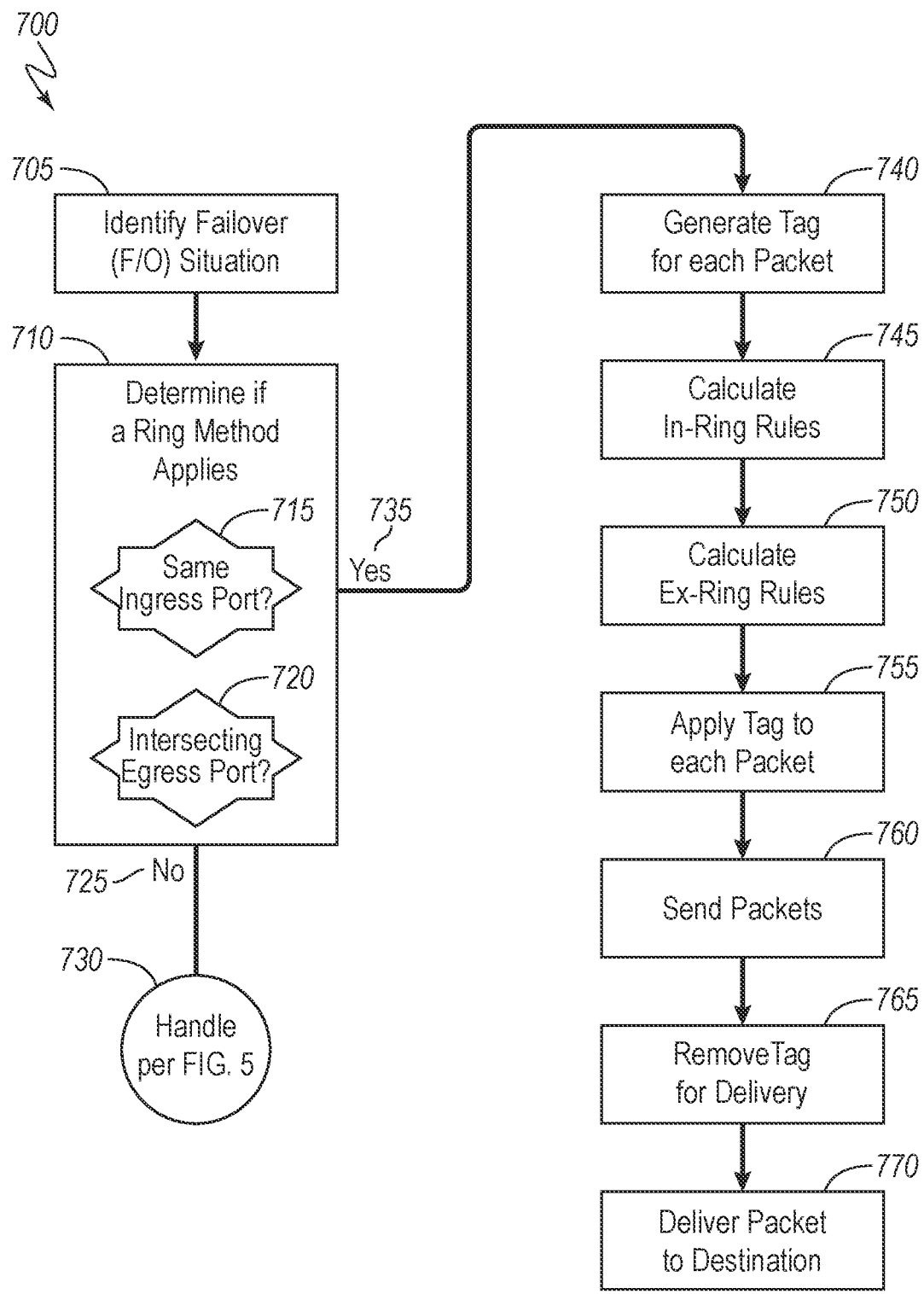
FIG. 7 is a flow diagram of a method of failover handling, according to another embodiment of the present disclosure.

FIG. 7 is a flow diagram of a method 700 of failover handling, according to an embodiment of the present disclosure. The method 700 may be employed at a network controller or other network superintending device in order to generate failover handling rules for each network device of the network and to populate the failover handling rules to network rules tables at each network device of the network. More particularly, the method 700 may be employed in a multicast network environment. The method 700 may also be employed at any device, such as a source device or a network device of the network in real time or near-real time in an event wherein a failover rule for a particular failover situation is not found in the network rules table of the particular network device (see the network 400, 600, the source device 410, 610, and the network devices 432-438, 681-691 of FIGS. 4 and 6)

A failover scenario is identified 705. As discussed in FIG. 5 (and relevant steps from FIG. 5 are identified for reference), failover route candidates are identified by determining possible routes in the network from each device in the network (or from that device that is immediately "upstream" of the failover point in the network) to one or more destination devices. Failover metadata is calculated 515 for each failover route. Failover metadata may comprise identifiers of network devices, and ports that may be used for each connection of each failover route, a failover route terminal network device, etc. Failover connection information is calculated, including ingress port, initial egress port, and failover egress port for each failover segment. Failover routes are grouped 525 into split failover traces by calculating 530 or otherwise determining common ingress ports, common initial egress ports, and/or common failover egress ports. A split failover route grouping may comprise a plurality of failover routes based on the failover route metadata. Path segments are calculated or otherwise determined for each split failover trace. A path segment comprises one or more connections between network device(s) with the connection(s) common to the failover routes of a given split failover route grouping. The path segment ends at a networking device where two or more failover routes of the failover route group diverge from each other. Said otherwise, where two or more failover routes have common route portions as defined by common ingress port, common initial egress port and common failover egress, the particular routes are grouped in a split failover trace.

A determination 710 is made if a ring methodology applies by checking whether a failover route is a qualified failover route, as will be described. Said otherwise, a check (whether switches exist where duplication differs) is made. A qualified split failover trace grouping is determined by checking each given network device of all network devices involved in the failover routes (of the split failover trace grouping) for overlapping traffic forwarding with another failover route. The split failover trace grouping is qualified if it includes overlapping traffic forwarding. Overlapping traffic forwarding has a same failover route ingress port and one or more intersecting egress ports at the given network device. An intersecting egress port at the given network device is a common port (and a relevant tag) between a first set of egress ports at the given network device for the failover route and a second set of egress ports at the given network device among a plurality of failover routes, and the first set of egress ports and second set of egress ports are distinct from each other. Determining 710 if a ring methodology applies thus comprises a determining 715 whether a same failover route ingress port is employed and determining 720 whether an intersecting egress port is employed at the given network device.

If the determination 710 is no (or fails) (a ring methodology is not identified), the method of FIG. 5 is handles 730 the failover situation.

If the determination 710 is yes 735, a trace tag is generated 760 reflecting failover handling for the particular network device and failover scenario. The trace tag is generated 740 based on or otherwise derived from the last network device in the ring methodology or a terminal network device of the longest failover route in the split failover route grouping of the qualified failover route. Trace tag generation further involves determining one or more failover trace rules for a collision zone of the qualified route. The collision zone comprises at least one path segment of the qualified route included in the overlapping traffic forwarding, and corresponds to failover actions and relevant the relevant trace tag. The trace tag is generated 740 to be applied to packets at the relevant network device. Delivery (to a destination device) handling is calculated 745 for inside the ring using the trace tag. The forwarding rules for transmission and/or delivery outside the ring methodology (see FIG. 5) are calculated 750. In a failover scenario, the relevant network device applies 755 the particular trace tag to each data packet, and the network settings (or network rules) are applied. In other words, the trace tag corresponding to the failover trace rule is applied 755 to the data packet that is sent to multiple destinations along a set of one or more path segments of the collision zone of the qualified failover route. The network device sends 760 each data packet. The final device before each destination device removes 765 the failover tag. When appropriate, the final device also replicates the data packet (with, as appropriate, the tag, or with a replacement tag, or with no tag) and forwards the data packet to the next device. Stated otherwise, the data packet is replicated (or duplicated) at an intersecting egress port (or egress ports) within the collision and the duplicated packet (or an instance of the data packet) is sent to an additional destination from the intersecting egress port. The final device before each destination delivers 770 the data packet, without the tag, to the destination device.

Figure 8:
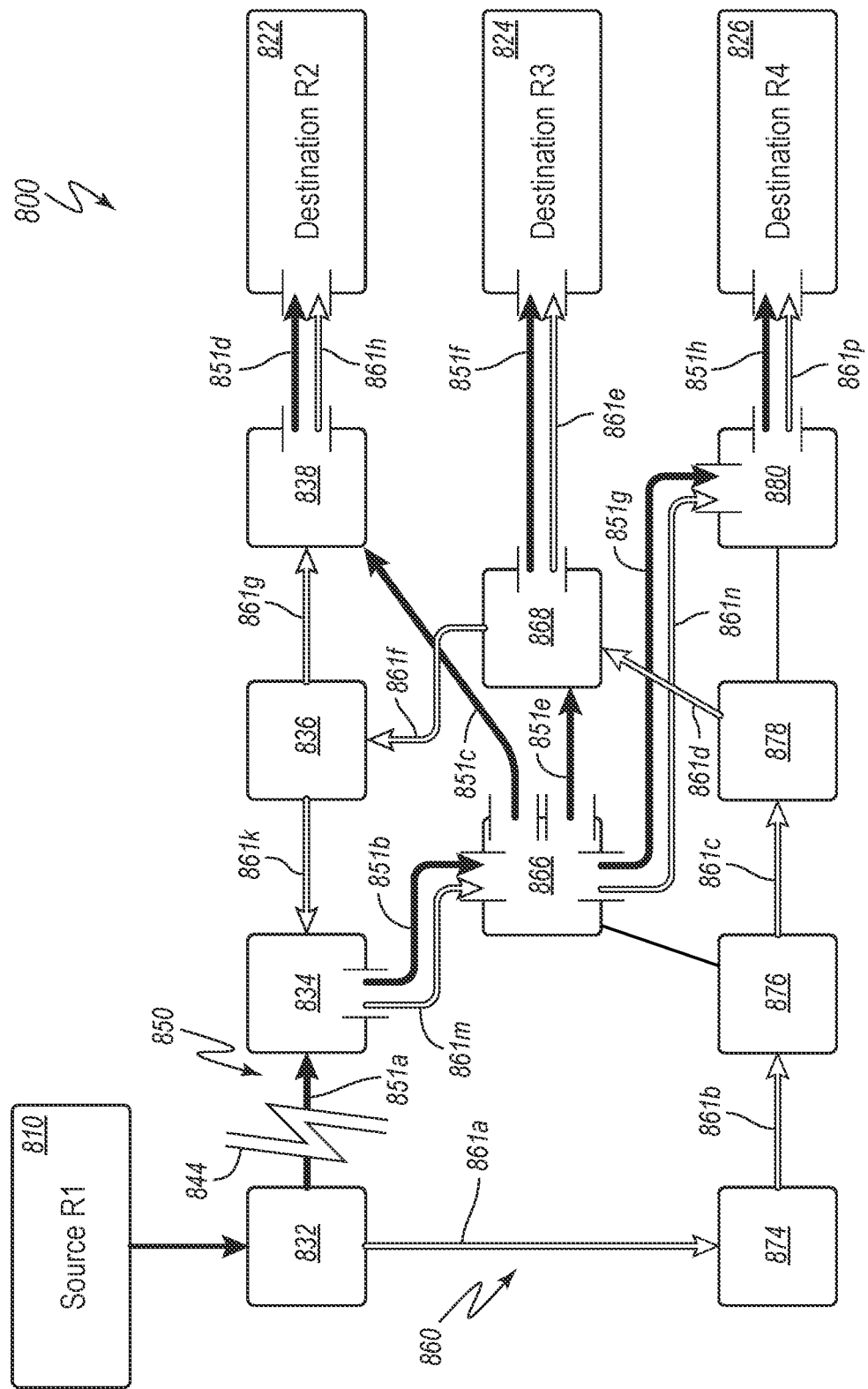
FIG. 8 is a diagram of a portion of a communication network, according to one embodiment, and having a mesh configuration.

FIG. 8 is a diagram of a portion of a communication network (network) 800, according to one embodiment, and having a mesh configuration. The network 800 operates in a multicast mode. The network 800 may employ, in part, a ring methodology. A source device 810 is shown, representing the origin of multi-cast traffic on the network for the example of FIG. 8. A plurality of destination devices 822, 824, 826 is shown with each intended to receive the network traffic originating from the source device 810. The network 810 comprises a plurality of network devices 832, 834, 836, 838, 866, 868, 874, 876, 878, and 880. When the network 800 operates with no interruption, a primary route 850 is employed. The primary route comprises a connections 851a, 851b, 851c, 851d, 551e, 851f, 851g, and 851h, which successively and respectively couple the network devices 832, 834, 866, 838, 868, and 880 to the destination devices 822, 824, 826, respectively.

An interruption 844 is shown at the connection 851a of the primary route 850. The network device 832, based on the header of the data packet, retrieves a corresponding failover rule for routing the data packet along the failover route 860 (or calculates a failover route 860). While another failover scenario can occur and another failover route can be employed in the illustrated network 800, the disclosure discusses the failover route 860 for convenience without limitation. The failover route 860 is derived using the method 700 described above in conjunction with FIG. 7. More particularly, a plurality of failover routes which have been grouped together based on a common entry point (the network device 832) and an intersecting network device 868. For the selected failover route 860, the network device 832 applies a tag to the data packet. The tag directs delivery of the data packet across the network 800 and to each of the destination devices 822, 824, 846. The tag causes the network device 832 to send the data packet to the network device 874 (via the connection 861a), and the data packet is successively sent to the network devices 876, 878, and 868 (via the connections 861b, 861c, and 861d). The network device 868 is the first network device to take an action other than to send the data packet to a succeeding network device.

The network device 868, based on the tag applied at the network device 832, determines that the data packet needs to be replicated such that two identical data packet instances exist. The network device 868 delivers one data packet instance, without the tag applied at the network device 832, to the destination device 824. The network device 868, for the remaining data packet instance, may replace the tag that was applied at the network device 832 with a tag which directs delivery of the data packet to the destination devices 822 and 826. The network device 868 then forwards the data packet via the failover route segment 861f to the network device 836. The network device 836 reads the tag and looks up the failover handling in the network rules table. Following the corresponding network rule, the network device 836 replicates the data packet such the two identical data packets exist. The network device 836 applies to one data packet instance a tag directing the data packet be sent to the network device 838 for deliver to the destination device 822. The network device 836 applies to the remaining data packet instance a tag directing the data packet be sent to the network device 880 for delivery to the destination device 826.

The network device 836 sends the two instances of the data packet, with respective tags, to the corresponding network devices 838 (via the connection 861g) and the network device 834 (via the connection 861k). The network device 838, upon receiving the data packet, reads the tag, removes the tag, and delivers the data packet to the destination device via the connection 861h. In one embodiment, the network device 836 adds, to the instance of the data packet to be sent to the network device 834, a tag representing ultimate delivery to the destination device 826. In one embodiment, network device 836 send to the network device 834 an instance of the data packet with no tag, and the network device 834 may apply a tag representing ultimate delivery to the destination device 826. The network device 834 reads the tag (or reads the header and applies a tag) and then sends the data packet to the network device 866, from which the data packet is successively sent to the network device 880 (via the connections 861*m* and 861*n*). The network device 880 reads the tag when the data packet arrives, then removes the tag and delivers the data packet to the destination device 826 via the connection 861*p*.

The method and system of the present disclosure permits the network 800 to assure quick delivery to each destination device 822, 824, and 826 without delivering duplicate data packets to any of the destination devices 822-826 and does so without reverting to resending the data packet from the source device 810. As previously noted, another failover route may be used rather than the failover route 860. Furthermore, the disclosure anticipates that a collision could arise downstream from the network device 832 with traffic in the network, and each network device is configured to calculate a new failover route in such an instance.

Figure 9:
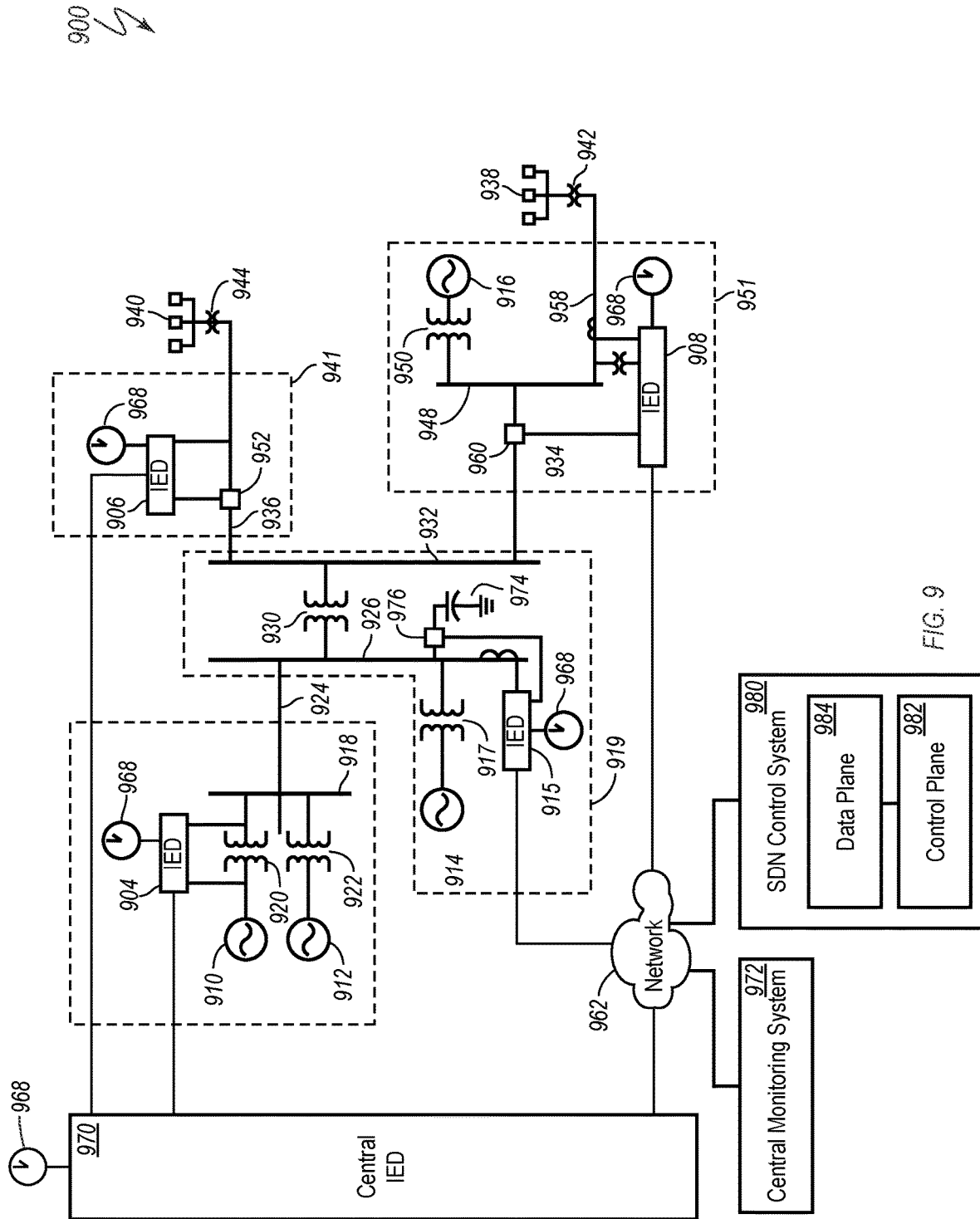
FIG. 9 is a simplified one-line diagram of an electric power transmission and distribution system in which a plurality of communication devices facilitate communication in a software-defined network (SDN), according to one embodiment of the present disclosure.

FIG. 9 is a simplified one-line diagram of an electric power transmission and distribution system 900 in which a plurality of communication devices 904, 906, 908, 915, 970, 972, 980 facilitate communication in a software-defined network (SDN), according to one embodiment of the present disclosure.

Electric power generation and delivery systems are designed to generate, transmit, and distribute electrical energy to loads. Electric power generation and delivery systems may include equipment such as: electrical generators, electrical motors, power transformers, power transmission and distribution lines, circuit breakers, switches, busses, voltage regulators, capacitor banks, and the like. Such equipment may be monitored, controlled, automated, and/or protected using one or more intelligent electronic devices (IEDs) that may receive electric power delivery system information from the equipment, make decisions based on the information, and provide monitoring, control, protection, and/or automation outputs to the equipment In some embodiments, an IED may include, for example, remote terminal units, differential relays, distance relays, directional relays, feeder relays, overcurrent relays, voltage regulator controls, voltage relays, breaker failure relays, generator relays, motor relays, bay controllers, meters, recloser controls, governors, exciters, statcom controllers, static VAR compensator (SVC) controllers, on-load tap changer (OLTC) controllers, and the like. Further, in some embodiments, IEDs may be communicatively connected via a data transmission network that includes, for example, multiplexers, routers, hubs, gateways, firewalls, and/or switches to facilitate communications on the network. Networking and communication devices may also be integrated into an IED and/or be in communication with an IED. As used herein, the term IED may refer to a single discrete IED or to a system of multiple IEDs operating together.

The electric power delivery system 900 may be configured to generate, transmit, and distribute electric energy to loads. Electric power delivery systems may include equipment, such as electric generators (e.g., generators 910, 912, 914, and 916), power transformers (e.g., transformers 917, 920, 922, 930, 942, 944, and 950), power transmission and delivery lines (e.g., lines 924, 934, and 958), circuit breakers (e.g., breakers 952, 960, and 976), busses (e.g., busses 918, 926, 932, and 948), loads (e.g., loads 940 and 938) and the like. A variety of other types of equipment may also be included in the electric power delivery system 900, such as voltage regulators, capacitor banks, and a variety of other types of equipment.

A substation 919 may include a generator 914, which may be a distributed generator, and which may be connected to the bus 926 through a step-up transformer 917. The bus 926 may be connected to a distribution bus 932 via a step-down transformer 930. Various distribution lines 936 and 934 may be connected to the distribution bus 932. The distribution line 936 may lead to a substation 941 and the line may be monitored and/or controlled using an IED 906, which may selectively open and close a breaker 952. A load 940 may be fed from the distribution line 936. A step-down transformer 944 in communication with the distribution bus 932 via the distribution line 936 may be used to step down a voltage for consumption by the load 940.

The distribution line 934 may lead to a substation 951 and deliver electric power to the bus 948. The bus 948 may also receive electric power from the distributed generator 916 via a transformer 950. The distribution line 958 may deliver electric power from the bus 948 to the load 938 and may include another step-down transformer 942. The circuit breaker 960 may be used to selectively connect the bus 948 to the distribution line 934. The IED 908 may be used to monitor and/or control the circuit breaker 960 as well as the distribution line 958.

The electric power delivery system 900 may be monitored, controlled, automated, and/or protected using intelligent electronic devices (IEDs), such as IEDs 904, 906, 908, 915, and 970, and a central monitoring system 972. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 904, 906, 908, 915, and 970) may refer to any microprocessor-based device that monitors, controls, automates, and/or protects monitored equipment within system 900. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal 968 may be distributed throughout system 900. Utilizing a common or universal time source may ensure that IEDs have a synchronized time signal that can be used to generate time synchronized data, such as synchrophasors. In various embodiments, IEDs 904, 906, 908, 915, and 970 may receive a common time signal 968. The common time signal 968 may be distributed in system 900 using a communications network 962 or using a common time source, such as a Global Navigation Satellite System (GNSS), or the like. The common time signal-68 may be distributed using, for example, PTP or NTP protocols.

According to various embodiments, the central monitoring system 972 may comprise one or more of a variety of types of systems. For example, central monitoring system 972 may include a supervisory control and data acquisition (SCADA) system and/or a wide area control and situational awareness (WACSA) system. A central IED 970 may be in communication with IEDs 904, 906, 908, and 915. IEDs 904, 906, 908 and 915 may be remote from the central IED 970 and may communicate over various media such as a direct communication from IED 906 or over a wide-area communications network-62, such as via a virtual private network (VPN). According to various embodiments, certain IEDs may be in direct communication with other IEDs (e.g., IED 904 is in direct communication with central IED 970) or may be in communication via a communication network 962 (e.g., IED 908 is in communication with central IED 970 via communication network 962).

Communication via the network 962 may be facilitated by networking devices 969. One or more of the networking devices 969 may receive the common time signal 968. Examples of networking devices 969 include, but are not limited to, multiplexers, routers, hubs, gateways, firewalls, and switches. In some embodiments, IEDs and networking devices may comprise physically distinct devices. In other embodiments, IEDs and networking devices may be composite devices or may be configured in a variety of ways to perform overlapping functions. IEDs and networking devices may comprise multi-function hardware (e.g., processors, computer-readable storage media, communications interfaces, etc.) that can be utilized to perform a variety of tasks that pertain to network communications and/or the operation of equipment within system 900. Thus, the terms networking device and IED may be used interchangeably in some instances to the extent that the IED is interacting with a network (e.g., an SDN) and/or to the extent that a networking device is performing a function of an IED as described herein.

An SDN controller 980 may be configured to interface with one or more of the networking devices 969. The SDN control system 980 may facilitate the creation of an SDN within the network 962 that facilitates communication between various devices, including IEDs 970, 915, 908, and monitoring system 972. In various embodiments, the SDN control system 980 comprises a control plane 982 and a data plane 984. An operator may use the SDN control system 980 to define (e.g., program) network operation profiles of one or more networking devices and/or IEDs connected to the network 962. One or more of the network operation profiles may be configured for implementation during a time window. The common time input 968 may provide a precise time input to the networking devices 969. The networking devices 969 may use the precise time to implement the one or more time-based network operation profiles during a precise time window.

The networking devices 969 may further use the precise time from the common time input 968 to implement time-based functions within the network operation profile. For example, a network operations profile implemented by one of the networking devices 969 may define an expected baseline communication between IED 915 and central IED 970. The networking device may determine that the precise timing of communications between IED 915 and central IED 970 deviates from an expected timing of communication as set forth in the network operations profile. The network operations profile may set forth the response or behavior of the networking device in the event of such a deviation. For example, the networking device may be configured to forward the deviate communications to the central IED 970 and raise an alert. Alternatively, the network operations profile may instruct the networking device to drop deviant data packets or forward deviant data packets to an intrusion detection system in addition to or instead of central IED 970.

The network 962 may be a high demand/high availability network. In other words, the network 962 may comprise thousands of network devices, such as IEDs 904-908, 915, 970, etc. A number of measures may be undertaken to facilitate the high demand on the network 962. These measures may include implementation of communication protocols that, e.g., reduce the size of each message communicated across the network, reduce the volume of duplicative messaging across the network, etc.

EXAMPLES

Example 1. A method for multicast fast failover handling in a network comprising: calculating failover metadata for each failover route of a plurality of failover routes for a network; grouping each failover route of the plurality of failover routes into a split failover route grouping based on the failover metadata; for all split failover route groupings, calculating one or more path segments, wherein a path segment comprises one or more connections between networking devices on the network, the one of more connections are common to the failover routes of a given split failover route grouping, and the path segments ends at a networking device where two or more failover routes of the plurality of failover routes diverge from each other; performing collision detection between split failover trace groupings to identify path segment that collide; and applying route tagging operations to network failover traffic for only the path segments that collide.

Example 2. The method of example 1, wherein the failover routes in a split failover route grouping all have the same ingress port, initial egress port, and failover egress port.

Example 3. The method of example 1, wherein the route tagging operations to be applied include application of at least one route tag to a data packet at a start point of a given path segment and removal of the tag at a last networking device of the given path segment.

Example 4. The method of example 1, wherein each failover route of the plurality of failover routes provides for handling in the event of failure of one or more primary (or preferred) routes of the network.

Example 5. The method of example 4, wherein each failover route of the plurality of failover routes is applicable in a failover scenario comprising a failure of a portion of a primary route, wherein the network implements the method to respond to the failover scenario by providing: delivery of packets to as many intended destination as the physical network allows with the failure; delivery of each packet to its intended destination a maximum of one time; and delivery of each packet unaltered from the state in which it entered the network.

Example 6. A method for multicast fast failover handling in a network comprising: calculating failover metadata for each failover route of a plurality of failover routes for a network; grouping each failover route of the plurality of failover routes into a split failover route grouping based on the failover metadata; for all split failover route groupings, calculating one or more path segments, wherein a path segment comprises one or more connections between networking devices on the network, the one or more connections are common to the failover routes of a given split failover route grouping, and the path segment ends at a networking device where two or more failover routes of the plurality of failover routes diverge from each other; applying route tagging operations to network failover traffic for the path segments.

Example 7. The method of example 6, wherein the failover routes in a split failover route grouping all have the same ingress port, initial egress port, and failover egress port.

Example 8. The method of example 6, wherein the route tagging operations to be applied include application of at least one route tag to a data packet at a start point of a given path segment and removal of the tag at a last networking device of the given path segment.

Example 9. The method of example 6, wherein each failover route of the plurality of failover routes provides for handling in the event of failure of one or more primary (or preferred) routes of the network.

Example 10. A communication network comprising: a plurality of network devices to be configured with rule settings for a plurality of primary (or preferred) routes and for a plurality of failover routes; a controller in communication with the plurality of network devices to configure the rule settings for the primary routes and the failover routes, the controller to: calculate failover metadata for each failover route of a plurality of failover routes for a network; group each failover route of the plurality of failover routes into a split failover route grouping based on the failover metadata; for all split failover route groupings, calculate one or more path segments, wherein a path segment comprises one or more connections between networking devices on the network, the one or more connections are common to the failover routes of a given split failover route groupings, and the path segment ends at a networking device where two or more failover routes of the plurality of failover routes diverge from each other, wherein the path segment further comprises route tagging operations to be applied, including application of at least one route tag to a data packet at a start point of a given path segment and removal of the tag at a last networking device of the given path segment; and apply route tagging operations to network failover traffic.

Example 11. The communication network of example 10, wherein the controller is further to: perform collision detection between the split failover trace groupings to identify path segments that collide, wherein the controller applies the route tagging operations to the network failover traffic for only the path segments that collide.

Example 12. The communication network of example 10, wherein the failover routes in a split failover route grouping have the same ingress port, initial egress port, and failover egress port.

Example 13. The communication network of example 10, wherein each failover route of the plurality of failover routes provides for handling in the event of failure of one or more primary (or preferred) routes of the network.

Example 14. The communication network of example 10, wherein the plurality of network devices comprises one or more network switches.

Example 15. The communication network of example 10, wherein the plurality of network devices comprises one or more hubs.

Example 16. The communication network of example 10, wherein the plurality of network devices comprises one or more intelligent electronic devices of an electrical power system.

Example 17. A software-defined network (SDN) comprising: a plurality of network devices (e.g., switches, etc.) interconnected to form the SDN, the plurality of network devices including primary rule settings that define a plurality of primary (or preferred) routes to deliver packets to one or more network devices, wherein the plurality of network devices include failover rule settings for a plurality of failover routes for multicast failover handling, the failover rule settings determine (e.g., by an SDN controller) by: calculating failover metadata for each failover route of a plurality of failover routes for a network; grouping each failover route of the plurality of failover routes into a split failover route grouping based on the failover metadata, wherein the failover routes in a split failover route grouping all have the same ingress port, initial egress port, and failover egress port; for all split failover route groupings, calculating one or more path segments, wherein a path segment comprises one or more connections between networking devices on the network, the one or more connections are common to the failover of a given split failover route grouping, and the path segment ends at a networking device where two or more failover routes of the plurality of failover routes diverge from each other, and wherein the path segment further comprises route tagging operations to be applied, including application of at least one route tag to a data packet at a start point of a given path segment and removal of the tag at a last networking device of the given path segment; and performing collision detection between the split failover trace groupings to identify path segments that collide; wherein, the plurality of network devices apply the route tagging operations to network failover traffic for only the path segments that collide.

Example 18. The SDN of example 17, wherein the plurality of network devices comprises one or more intelligent electronic devices (IEDs) to receive communications via the SDN to operate an electrical power grid.

Example 19. The SDN of example 17, wherein the plurality of network devices comprises one or more network switches.

Example 20. The SDN of example 19, further comprising one or more intelligent electronic devices (IEDs) to receive communications via the SDN to operate an electrical power grid.

Example 21. A method for multicast fast failover handling in a network comprising: calculating failover metadata for each failover route of a plurality of failover routes for a network; grouping each failover route of the plurality of failover routes into a split failover route grouping based on the failover metadata; calculating at least one path segment for each of the split failover route groupings, wherein a path segment comprises one or more connections between networking devices (e.g., switches, etc.) on the network, the one or more connections are common to the failover routes of a given split failover route grouping, and the path segment ends at a networking where two or more failover routes of the plurality of failover routes diverge from each other; for each failover route of the plurality of failover routes, determining whether it is a qualified failover route by checking each given network device of all network devices involved in the failover route for overlapping traffic forwarding with one or another failover route of the plurality of failover routes of the network, wherein the failover route is a qualified failover route if it includes overlapping traffic forwarding; for each qualified failover route: selecting a trace tag derived from a terminal network device (e.g. switch, etc.) of the longest failover route in the split failover route grouping of the qualified failover route; determining one of more failover trace rules for a collision zone of the qualified route, wherein the collision zone comprises a set of or more path segments of the qualified route that are included in the overlapping traffic forwarding, and wherein each failover trace rules corresponds to failover actions and corresponds to the trace tag, the failover actions including: applying the trace tag corresponding to the failover trace rule to a transmitted data packet that is sent to multiple destinations along the set of one or more path segments of the collision zone of the qualified failover route; duplicating the transmitted data packet at one or more intersecting egress ports within the collision zone to create a duplicate data packet; sending the duplicated data packet to at least one additional destination of the multiple destinations from the one or more intersecting egress ports; and removing the trace tag as the transmitted packet exist the collision zone.

Example 22. The method of example 21, wherein the longest failover route is determined based on a number of networking device (and connections between networking devices) along each failover route in the split failover route grouping of the qualified failover route.

Example 23. The method of example 21, wherein the overlapping traffic forwarding has a same failover route ingress port and one or more intersecting egress ports at the give network device, wherein an intersecting egress port at the given network is a common port between a first set of egress ports at the given network device for the failover route and a second set of egress ports at the given network device for the one of the another failover route and a primary route, and wherein the first set of egress ports and second set of egress ports are distinct from each other.

Example 24. The method of example 21, wherein the transmitted packet exits the failover route by one of: leaving the network to a final destination (e.g., delivery) and reconverging with a primary (or preferred) route of the network.

Example 25. The method of example 21, wherein the path segment further comprises route tagging operations to be applied, including application of at least one route tag to a data packet at a starting point of the path segment and removal of the tag at a last networking device of the path segment.

Example 26. The method of example 25, further comprising: for each failover route path segment outside of a collision zone: performing collision detection between the split failover route groupings to identify path segments of the failover route that collide; and applying the tagging operations to network failover traffic for only the path segments that collide.

Example 27. The method of example 21, wherein the duplicate data packet includes the trace tag.

Example 28. The method of example 21, wherein the failover routes in a split failover route grouping have the same ingress port, initial egress port, and failover egress port.

Example 29. The method of example 21, wherein the failover routes provide for handling in the event of failure of one or more primary (or preferred) routes of the network.

Example 30. The method of example 21, further comprising determining the plurality of failover routes for the network.

Example 31. The method of example 21, further comprising configuring, rule settings of one or more network devices of the network to include the failover trace rules.

Example 32. A communication network comprising: a plurality of switches to be configured with rule settings for a plurality of primary (or preferred) routes and for a plurality of failover routes; a controller in communication with the plurality of switches to configure the rule settings for the primary routes and failover routes, the controller to: calculate failover metadata for each failover route of a plurality of failover routes for a network; group each failover route of the plurality of failover routes into a split failover route grouping based on the failover metadata; calculate at least one path segment for each of the split failover route groupings, wherein a path segment comprises one or more connections between networking devices (e.g., switches, etc.) on the network, the one or more connections are common to the failover routes of a given split failover route grouping, and the path segment ends at a networking where two or more failover routes of the plurality of failover routes diverge from each other; for each failover route of the plurality of failover routes, determine whether it is a qualified failover route by checking each given network device of all network devices involved in the failover route for overlapping traffic forwarding with one or another failover route of the plurality of failover routes of the network, wherein the failover route is a qualified failover route if it includes overlapping traffic forwarding; for each qualified failover route: select a trace tag derived from a terminal network device (e.g. switch, etc.) of the longest failover route in the split failover route grouping of the qualified failover route; determine one of more failover trace rules for a collision zone of the qualified failover route, wherein the collision zone comprises a set of or more path segments of the qualified route that are included in the overlapping traffic forwarding, and wherein each failover trace rules corresponds to failover actions and corresponds to the trace tag, the failover actions including: applying the trace tag corresponding to the failover trace rule to a transmitted data packet that is sent to multiple destinations along the set of one or more path segments of the collision zone of the qualified failover route; duplicating the transmitted data packet at one or more intersecting egress ports within the collision zone to create a duplicate data packet; sending the duplicated data packet to at least one additional destination of the multiple destinations from the one or more intersecting egress ports; and removing the trace tag as the transmitted packet exist the collision zone.

Example 33. A software-defined network (SDN) comprising: a plurality of SDN switches interconnected to form an SDN, the plurality of SDN switches including primary rule settings that define a plurality of primary (or preferred) routes to deliver packets to one or more network devices, wherein the plurality of SDN switches include failover rule settings for a plurality of failover routes for multicast failover handling, the failover rule settings determined (e.g., by an SDN controller) by: calculating failover metadata for each failover route of a plurality of failover routes for a network; grouping each failover route of the plurality of failover routes into a split failover route grouping based on the failover metadata; calculating at least one path segment for each of the split failover route groupings, wherein a path segment comprises one or more connections between networking devices (e.g., switches, etc.) on the network, the one or more connections are common to the failover routes of a given split failover route grouping, and the path segment ends at a networking where two or more failover routes of the plurality of failover routes diverge from each other; for each failover route of the plurality of failover routes, determining whether it is a qualified failover route by checking each given network device of all network devices involved in the failover route for overlapping traffic forwarding with one or another failover route of the plurality of failover routes of the network, wherein the failover route is a qualified failover route if it includes overlapping traffic forwarding; for each qualified failover route: selecting a trace tag derived from a terminal network device (e.g. switch, etc.) of the longest failover route in the split failover route grouping of the qualified failover route; determining one of more failover trace rules for a collision zone of the qualified route, wherein the collision zone comprises a set of one or more path segments of the qualified route that are included in the overlapping traffic forwarding, and wherein each failover trace rules corresponds to failover actions and corresponds to the trace tag, the failover actions including: applying the trace tag corresponding to the failover trace rule to a transmitted data packet that is sent to multiple destinations along the set of one or more path segments of the collision zone of the qualified failover route; duplicating the transmitted data packet at one or more intersecting egress ports within the collision zone to create a duplicate data packet; sending the duplicated data packet to at least one additional destination of the multiple destinations from the one or more intersecting egress ports; and removing the trace tag as the transmitted packet exist the collision zone.

Example 34. A method for multicast fast failover handling in a network comprising: calculating failover metadata for each failover route of a plurality of failover routes for a network, the failover routes providing for handling in the event of failure of one or more primary (or preferred) routes of the network; grouping each failover route of the plurality of failover routes into a split failover route grouping based on the failover metadata, wherein the failover routes in a split failover route grouping all have the same ingress port, and failover egress port; calculating at least one path segment for each of the split failover route groupings, wherein a path segment comprises one or more connections between networking devices on the network, the one or more connections are common to the failover routes of a given split failover route grouping, and the path segment ends at a networking device where two or more failover routes of the plurality of failover routes diverge from each other, and wherein the path segment further comprises route tagging operations to be applied, including application of at least one route tag to a data packet at a start point of a given path segment and removal of the tag at a last networking device of the given path segment; for each failover route of the plurality of failover routes, determining whether it is a qualified failover route by checking each given switch of all switches involved in the failover route for overlapping traffic forwarding with one of another failover route of the plurality of failover routes, the overlapping traffic forwarding having a same failover route ingress port and one or more intersecting egress ports at the given switch, wherein an intersecting egress port at the given switch is a common port between a first set of egress ports at the given switch for the failover route and a second set of egress ports at the given switch for the another failover route and the first set of egress ports and second set of egress ports are distinct from each other, wherein the failover route is a qualified failover routes it includes overlapping traffic forwarding; for each qualified failover route: selecting a trace tag derived from a terminal switch of the longest failover route in the split failover route grouping of the qualified failover route (or a terminal switch of the highest cost failover route in the split failover route grouping of the qualified failover route); determining or calculating one or more failover trace (or delivery and forwarding) rules for a collision zone of the qualified route, wherein the collision zone comprises a set of one or more path segments of the qualified route that are included in the overlapping traffic forwarding, and wherein each failover trace rule corresponds to failover actions (e.g., output actions) and corresponds to the trace tag, the failover actions including: applying the trace tag corresponding to the failover trace rule to a transmitted data packet that is sent to multiple destinations along the set of one or more path segments of the collision zone of the qualified failover route: duplicating the transmitted data packet at one or more intersecting egress ports within the collision zone, the duplicated data packet including the trace tag; sending the duplicated data packet to at least one additional destination of the multiple destinations from the one or more intersecting egress ports; and removing the trace tag as the transmitted data packet exits a collision zone; for each failover route path segment outside of a collision zone: performing collision detection between the split failover route groupings to identify path segments of the failover route that collide; and applying the tagging operations to network failover traffic for only the path segments that collide.

Example 35. A method for multicast fast failover handling in a network comprising: calculating failover meta data for each failover route of a plurality of failover routes for a network, the failover routes providing for handling in the event of failure of one or more primary routes of the network; grouping each failover route of the plurality of failover routes into a split failover route grouping based on the failover meta data, wherein the failover routes in a split failover route grouping have the same ingress port and initial egress port; calculating at least one path segment for each of the split failover route groupings, wherein a path segment comprises one or more connections between networking devices on the network, the one or more connections are common to the failover routes of a given split failover route grouping, and the path segment ends at a networking device where two or more failover routes of the plurality of failover routes diverge from each other, and wherein the path segment further comprises route tagging operations to be applied, including application of at least one route tag to a data packet at a start point of a given path segment and removal of the tag at a last networking device of the given path segment; for each split failover route grouping, determining whether it is a qualified split failover route grouping by checking each given switch of all switches involved in the split failover route grouping for overlapping traffic forwarding with another split failover route grouping, the overlapping traffic forwarding having a same split failover route grouping ingress port and one or more intersecting egress ports at the given switch, wherein an intersecting egress port at the given switch is a common port between a first set of egress ports at the given switch for the split failover route grouping and a second set of egress ports at the given switch for the another split failover route grouping, wherein the first set of egress ports and second set of egress ports are distinct, and wherein the failover route is a qualified failover route if it includes overlapping traffic forwarding; for each qualified split failover route grouping: selecting a trace tag derived from a terminal network device of the longest failover route in the qualified split failover route grouping; determining one or more failover trace rules for a collision zone of the qualified split failover route grouping, wherein the collision zone comprises a set of one or more path segments of the qualified split failover route grouping that are included in the overlapping traffic forwarding, and wherein each failover trace rule corresponds to failover actions and corresponds to the trace tag, the failover actions including: applying the trace tag corresponding to the failover trace rule to a transmitted data packet that is sent to multiple destinations along the set of one or more path segments of the collision zone of the qualified split failover route grouping; duplicating the transmitted data packet at one or more intersecting egress ports within the collision zone, the duplicated data packet including the trace tag; sending the duplicated data packet to at least one additional destination of the multiple destinations from the one or more intersecting egress ports; and removing the trace tag as the transmitted data packet exits a collision zone; for each failover route path segment outside of a collision zone: performing collision detection between the split failover route groupings to identify path segments of the failover route that collide; and applying the tagging operations to network failover traffic for the path segments that collide.

Example 36. A method for multicast fast failover handling in a network comprising: sending a single data packet to multiple destinations along a path segment; replicating or duplicating the data packet at a specific outgoing port of a network device with the network; applying at least one failover trace rule with output actions for the packet at the specific outgoing port, wherein the failover route rule matches a specific trace tag, wherein the specific trace tag applies to the specific outgoing port, and wherein the output actions comprise sending the replicated packet to at least one additional destination of the multiple destinations via at least one additional outgoing port; and removing the specific trace tag at the specific outgoing port.

It will be obvious to those having skill in the art that many changes may be made to the details of the above-described embodiments without departing from the underlying principles of the invention. The scope of the present invention should, therefore, be determined only by the following claims.

The invention claimed is:

1. A method for multicast fast failover handling in a network comprising:
   calculating failover meta data for each failover route of a plurality of failover routes for a network;
   grouping each failover route of the plurality of failover routes into a split failover route grouping based on the failover meta data;
   for all split failover route groupings, calculating one or more path segments, wherein a path segment comprises one or more connections between networking devices on the network, the one or more connections are common to the failover routes of a given split failover route grouping, and the path segment ends at a networking device where two or more failover routes of the plurality of failover routes diverge from each other;
   performing collision detection between the split failover trace groupings to identify path segments that collide; and
   applying route tagging operations to network failover traffic for the path segments that collide.

2. The method of claim 1, wherein the failover routes in a split failover route grouping have the same ingress port and initial egress port.

3. The method of claim 1, wherein the route tagging operations to be applied include application of at least one route tag to a data packet at a start point of a given path segment and removal of the tag at a last networking device of the given path segment.

4. The method of claim 1, wherein each failover route of the plurality of failover routes provides for handling in the event of failure of one or more primary routes of the network.

5. The method of claim 4, wherein each failover route of the plurality of failover routes is applicable in a failover scenario comprising a failure of a portion of a primary route, wherein the network implements the method to respond to the failover scenario by providing:
   delivery of packets to as many intended destinations as the network allows with the failure;
   delivery of each packet to its intended destination a maximum of one time; and
   delivery of each packet unaltered from the state in which it entered the network.

6. A method for multicast fast failover handling in a network comprising:
   calculating failover meta data for each failover route of a plurality of failover routes for a network;
   grouping each failover route of the plurality of failover routes into a split failover route grouping based on the failover meta data;
   for all split failover route groupings, calculating one or more path segments, wherein a path segment comprises one or more connections between networking devices on the network, the one or more connections are common to the failover routes of a given split failover route grouping, and the path segment ends at a networking device where two or more failover routes of the plurality of failover routes diverge from each other;
   applying route tagging operations to network failover traffic for the path segments.

7. The method of claim 6, wherein the failover routes in a split failover route grouping have the same ingress port and initial egress port.

8. The method of claim 6, wherein the route tagging operations to be applied include application of at least one route tag to a data packet at a start point of a given path segment and removal of the tag at a last networking device of the given path segment.

9. The method of claim 6, wherein each failover route of the plurality of failover routes provides for handling in the event of failure of one or more primary routes of the network.

10. A communication network comprising:
    a plurality of network devices to be configured with rule settings for a plurality of primary routes and for a plurality of failover routes;
    a controller in communication with the plurality of network devices to configure the rule settings for the primary routes and the failover routes, the controller to:
    calculate failover meta data for each failover route of a plurality of failover routes for a network;
    group each failover route of the plurality of failover routes into a split failover route grouping based on the failover meta data;
    for all split failover route groupings, calculate one or more path segments, wherein a path segment comprises one or more connections between networking devices on the network, the one or more connections are common to the failover routes of a given split failover route grouping, and the path segment ends at a networking device where two or more failover routes of the plurality of failover routes diverge from each other, wherein the path segment further comprises route tagging operations to be applied, including application of at least one route tag to a data packet at a start point of a given path segment and removal of the tag at a last networking device of the given path segment; and
    apply route tagging operations to network failover traffic.

11. The communication network of claim 10, wherein the controller is further to:

perform collision detection between the split failover trace groupings to identify path segments that collide,
wherein the controller applies the route tagging operations to the network failover traffic for the path segments that collide.

12. The communication network of claim 10, wherein the failover routes in a split failover route grouping have the same ingress port and initial egress port.

13. The communication network of claim 10, wherein each failover route of the plurality of failover routes provides for handling in the event of failure of one or more primary routes of the network.

14. The communication network of claim 10, wherein the plurality of network devices comprises one or more network switches.

15. The communication network of claim 10, wherein the plurality of network devices comprises one or more hubs.

16. The communication network of claim 10, wherein the plurality of network devices comprises one or more intelligent electronic devices of an electrical power system.

17. A software-defined network (SDN) comprising:
a plurality of network devices interconnected to form the SDN, the plurality of network devices including primary rule settings that define a plurality of primary routes to deliver packets to one or more network devices,
wherein the plurality of network devices include failover rule settings for a plurality of failover routes for multicast failover handling, the failover rule settings determined by:
calculating failover meta data for each failover route of a plurality of failover routes for a network;
grouping each failover route of the plurality of failover routes into a split failover route grouping based on the failover meta data, wherein the failover routes in a split failover route grouping have the same ingress port and initial egress port;
for all split failover route groupings, calculating one or more path segments, wherein a path segment comprises one or more connections between networking devices on the network, the one or more connections are common to the failover routes of a given split failover route grouping, and the path segment ends at a networking device where two or more failover routes of the plurality of failover routes diverge from each other, and wherein the path segment further comprises route tagging operations to be applied, including application of at least one route tag to a data packet at a start point of a given path segment and removal of the tag at a last networking device of the given path segment; and
performing collision detection between the split failover trace groupings and the plurality of primary routes to identify path segments that collide;
wherein, the plurality of network devices apply the route tagging operations to network failover traffic for the path segments that collide.

18. The SDN of claim 17, wherein the plurality of network devices comprises one or more intelligent electronic devices (IEDs) to receive communications via the SDN to operate an electrical power grid.

19. The SDN of claim 17, wherein the plurality of network devices comprises one or more network switches.

20. The SDN of claim 19, further comprising one or more intelligent electronic devices (IEDs) to receive communications via the SDN to operate an electrical power grid.

* * * * *